US005934437A

United States Patent [19]

Anson et al.

[11] Patent Number: 5,934,437

[45] Date of Patent: Aug. 10, 1999

[54] SUPPORT AND HOIST SYSTEMS

[75] Inventors: Andrew Philip Anson, Montreal; Henry Vandelinde, Queensville, both of Canada

[73] Assignee: Joysun Ltd., Devon, United Kingdom

[21] Appl. No.: 08/655,499

[22] Filed: May 30, 1996

[51] Int. Cl.[6] .................................................. B65G 11/00

[52] U.S. Cl. .............................................. 193/15; 212/179

[58] Field of Search ................................. 193/15, 3, 4, 5; 212/179; 182/142

[56] References Cited

U.S. PATENT DOCUMENTS

| | | | |
|---|---|---|---|
| 388,542 | 8/1888 | Du Bois | 193/3 |
| 400,121 | 3/1889 | Schaefer | 182/142 |
| 849,477 | 4/1907 | Irwin | 193/3 |
| 1,180,543 | 4/1916 | Rose . | |
| 1,208,964 | 12/1916 | Hodges | 193/15 |
| 1,240,215 | 9/1917 | Hunt . | |
| 1,331,020 | 2/1920 | Maclennan | 193/15 |
| 1,448,272 | 3/1923 | Kelly | 193/15 |
| 1,545,295 | 7/1925 | Wilford . | |
| 1,951,703 | 3/1934 | Morison et al. . | |
| 4,004,778 | 1/1977 | Steinhagen | 182/142 |
| 4,234,055 | 11/1980 | Beeche | 182/142 |
| 4,386,680 | 6/1983 | Reed | 182/142 |
| 5,224,612 | 7/1993 | Shirkey | 212/179 |
| 5,341,898 | 8/1994 | Baziuk | 182/142 |
| 5,498,011 | 3/1996 | Kilada et al. | 182/142 |

*Primary Examiner*—William E. Terrell
*Assistant Examiner*—Khoi H. Tran
*Attorney, Agent, or Firm*—Ronald S. Kosie; Robert Brouillette; Nicolas Pellemans

[57] ABSTRACT

A support generally comprising a mast component, a boom component extending forwardly from the mast component, and a stabilizing component for maintaining the support in a working disposition. The support may be used in conjunction with a lifting pole for forming a hoist system. The support and hoist system may be used to support or raise and lower an object such as a chute for debris.

22 Claims, 23 Drawing Sheets

SUPPORT AND HOIST SYSTEMS

The present invention relates to a support for supporting an object as well as to a hoist system which exploits a support and a lifting pole attached (e.g. releasably attached) thereto.

A support and a hoist system will in particular be described herein in relation to a chute having one or more tubular sections but it is to be understood that the object to be supported or displaced thereby may take on any form.

It is known to use a vertically supported chute along side a building for expediting the removal of debris from the upper floors or roof of the building. Commonly, a building will not be equipped with a means for supporting the chute nor with a means for raising or lowering such a chute. It would for example be advantageous to have a support which may be used on a roof or in a wall opening. It would also be advantageous to have a hoist system which may be adapted to facilitate access to a chute opening, to a window opening, etc.

STATEMENT OF INVENTION

The present invention in a general aspect provides a support or frame structure which may be used for hanging an object such as, for example, a chute and in particular a debris chute.

The support generally comprises a mast component, a boom component extending forwardly from said mast component, and a stabilizing component for maintaining the support in a working disposition.

It is to be understood herein that the expression a "working disposition" in relation to a support, characterizes the support as being in a functional or operative state, i.e. as being in a working configuration and as being able to support, in addition to its own components, (the weight of) a predetermined object and includes, for example, the case when the boom component extends out into the air (e.g. beyond the edge of a roof surface) but is not supporting an object (e.g. a chute comprising one or more tubular sections) as well as the case when such boom component is attached to an object (e.g. a chute as described herein).

A support in accordance with the present invention may be disposed on a roof surface, through a wall opening, etc. The support may for example be one which is of a rebuildable kind, i.e. the support may be taken apart and be rebuildable from a kit.

The mast component may take on any desired or necessary form. The mast component, when in a working position, may extend upwardly, i.e. it may extend vertically upwards more or less perpendicularly to the horizontal plane or if desired at some non-perpendicular angle to the horizontal plane.

The stabilizing component may take on any desired or necessary form keeping in mind its purpose, namely to maintain the support in a working disposition. The stabilizing component may, for example, as described herein, comprise a counter balance component, a cross beam component, a foot component and/or the like; the stabilizing component may, for example, comprise a circular or cross like foundation or base member from the center of which a mast component may upwardly extend (e.g. each mast may independently be associated with such a base).

Thus the stabilizing component may comprise a counter balance component which may comprise a counter balance member(s) which is (are) configured so as to be able to counter balance or counteract the weight of the support components and as well as that of the object which is intended to be hung from the boom component. For example, if such a support is disposed on a roof surface adjacent the edge thereof the counter balance component is configured such that the center of gravity is disposed over the roof surface (e.g. as far from the roof edge as possible), i.e. whether the support is alone or whether the support is supporting an object attached thereto.

The counter balance component may, for example, be attached to and extend rearwardly from the mast component. A counter balance component may for example comprise means for (releasably) bolting this component to a surface. Alternatively a counter balance component may advantageously comprise counter weight means; such means would avoid having to damage a support surface not provided with means for fixing the component thereto. The counter weight means may comprise one or more removable or replaceable counter weight elements, e.g. one or more weight elements which are for example seated on a tail element of a counter balance member which extends rearwardly of a respective mast.

Advantageously, a mast component may be pivotally attached to a rearwardly extending counter balance component such that the mast component is able to pivot between a working mast position and a reaward non-working mast position and wherein said support comprises a locking component for releasably locking said mast component in said working position. The pivotability of the mast component is intended to help facilitate the placing of the support next to the edge of the roof of a building as shall be explained below. The locking component may take any desired form keeping in mind its function, namely to releasably lock a mast in a working mast position. The locking means may, for example, comprise a snap lock mechanism, a latch mechanism, openings on the mast and counter balance components for cooperation with a bolt/nut combination, a rod connectable at its ends at the rear of the support to attachment elements (e.g. to openings by screw bolts) on the mast and balance components such that the rod is inclined upwardly from the balance part to the mast part, etc.

The stabilizing component may, alternatively, for example, comprise a foot component which is able to engage a wall face of a wall and which cooperates with a mast component which is also able to engage the opposite wall face of the wall. In this case the mast and foot components are configured and disposed so as to be able to cooperate such that when an object is supported by the support, the foot component is able to urged towards a respective wall face in one direction and the mast component is able to be urged towards the other respective wall face in the opposite direction such that the force exerted by the weight of the object is counteracted or offset by the opposite forces exerted by the wall on the mast and foot components. Such a support may for example be used on top of a wall or in relation to a wall opening such as for example a window, a crenel like opening, etc.

The foot component may take on any desired form and be attached to the other elements of the support as desired. Thus for example a boom component may comprise a tail part and a forward part. The tail part may be releasably attached to the mast component. The tail part may also be releasably attached to the forward part. A foot part may be releasably attached to the forward part. The tail part and the mast component may be configured such that the tail part is releasably attachable to the mast component at a plurality of vertical positions on said mast component; this allows for a height adjustment of the boom relative to a window sill for example. The tail part and the forward part may also be configured such that the forward part is releasably attachable to the tail part at a plurality of positions for altering or adjusting the horizontal distance between the mast component and the foot part, this allows for a width adjustment to take into account the different thicknesses of walls to which the support may be attached.

A support in accordance with the present invention may comprise boom hanging means for engaging the object to be supported by the support. The mast component, the boom component, and the counterbalance component and the boom hanging means are of course disposed and configured such that the boom hanging means is able to engage an object such that the object is able to hang from the boom component.

The boom hanging means may also take any desired or necessary form; it is, however, to be kept in mind that an object is to be hung from the boom component by the boom hanging means. The boom hanging means can for example comprise one or more attachment rope elements which may simply include a rope part an end of which can be tied to the object. Alternatively, if desired the rope element may also include a releasable hooking clip member or other similar or analogous attachment means which may be attached (e.g. clipped) to a hooking element, a U-shaped bolt element, or the like which is attached to the object.

A support in accordance with the present invention may comprise a stabilizing component which comprises a cross beam component for the interconnection of two or more mast/boom/balance combinations (e.g. for providing rigidity to the support); the cross beam component being able to stabilize the combinations in a working disposition; and each such combination comprising a mast element, a boom element extending from the mast element and a counter balance element extending from the mast element. The cross beam component may take any desired configuration and disposition. The cross beam component may for example comprise one, two, three or more cross beams; sufficient cross beams being present so as to provide the desired or necessary stability.

Keeping in mind the function of the support, the mast component may comprise one or more mast elements (e.g. 1, 2, 3 or more of such elements), the boom component may comprise one or more boom elements (e.g. 1, 2, 3 or more of such elements); the counter balance component may comprise one or more counter balance elements (e.g. 1, 2, 3 or more of such elements); the hanging means, if any, may comprise one or more hanging elements (e.g. 1, 2, 3 or more of such elements), etc. Thus a stabilizing component may for example comprise a counterbalance component and a cross beam component; the stabilizing component may comprise a foot component and a cross beam component; and/or the like. The components may, for example, be releasably interconnected.

More particularly, the present invention provides a support for hanging an object, said support comprising two spaced apart mast/boom/balance combinations, and a stabilizing component for maintaining the support in a working disposition, said stabilizing component comprising a cross beam component interconnecting said mast/boom/balance combinations, each mast/boom/balance combination comprising a mast, a boom, and a counter balance member, said stabilizing component comprising said counter balance member, each boom being attached to and extending forwardly from a respective mast, each counter balance member being attached to and extending rearwardly from a respective mast, each said counter balance member comprising counterweight means.

The masts are intended to be upstanding members which may extend vertically upwards more or less perpendicularly to the horizontal plane or if desired at some non-perpendicular angle to the horizontal plane. The booms may extend horizontally forward more or less perpendicularly to the vertical plane or if desired at some non-perpendicular angle to the vertical plane. The counter balance members may extend horizontally rearward more or less perpendicularly to the vertical plane or if desired at some non-perpendicular angle to the vertical plane.

The booms may be attached to the upper ends of the masts or at some lower position thereon. Similarly, the counter balance members may be attached to the base of the masts or at some upper position thereon. A counter balance member may, for example, have an elongated body which can rest on a support surface and which is attached to the base of a mast; alternatively, the elongated body may be attached at an upper part of the mast such that a rear distal end of the elongated body rests on the support surface from which end it is inclined upwardly to the mast.

The cross beam component may as mentioned above comprise one or more cross beams. It may, for example, include or comprise one or more cross beams which are attached (e.g. releasably attached) to the booms; it may alternatively or additionally include one or more cross beams interconnecting(e.g. releasably interconnecting) the masts; it may alternatively or additionally include one or more cross beams interconnecting (e.g. releasably interconnecting) the counterbalance members; etc.

Each boom (and any respective counter balance member) of the support may also be releasably attached to a respective mast, e.g. if the support is to be built up from a rebuildable kit as described hereinbelow.

A mast as mentioned above may be pivotally connected to a counter balance member. Thus for example each mast may be attached in a working mast position to a respective counter balance member at a first (e.g. forward) releasable lock point on the counter balance member and at a seond (e.g. rearward) pivot point on the counter balance member. This type of attachment mechanism may be configured so as to allow the mast and counterbalance components to be attached together either in a locked configuration or in a semi-attached configuration. In the locked configuration the two components are attached at both the locking point and the pivot point with the mast in the working mast position. In the semi attached configuration the mast and the counterbalance component are attached only at the pivot point such that the mast is able to pivot about the pivot point between the working mast position and a rearward non-working mast position. As may be understood the mast is releasably attached to the counter balance component at the locking point so as to allow the mast to either be held in a working mast position or to be lowered backwards to a non working mast position. The mast may as desired be releasably or non-releasably attached to the counter balance member at a pivot point in any suitable or desired manner so long as appropriate pivoting of the mast is possible when the mast is not locked in position.

The mast and a counterbalance component may be releasably attached to each other in any desired or necessary way, e.g. with bolt/nut combinations, bolt/lock pin combinations, and the like. The mast may also be attached to the counter balance member at the pivot point by some sort of more or less permanent pivot or hinge attachment which can take any desired or necessary form. Advantageously the mast and counter balance member may be releasably attached at the pivot point so as to facilitate the breaking down of the support into smaller elements for ease of transport and/or storage, i.e. the releasable elements are detached from each other for later rebuilding of the support.

The pivotability of the mast about the pivot point helps facilitate the disposition of the support next to the edge of the roof of a building. In the case of a support having two counter balance members, with this type of arrangement the locking point of both of the counter balance members may, for example, be a forward locking point. Once the forward locking point is disposed adjacent to the edge of the roof, any counter weight members may subsequently be added to the stabilizing component.. The masts may each be attached to a respective pivot point such that the masts are in a rearward non-working mast position. At this point if the booms are not attached to respective masts they may be so attached. Additionally, for example, any desired cross beams may be attached between the masts and/or booms and/or counter balance members. For example, as desired, a cross beam may be connected between the ends of the counter balance members to which the masts are attached and which are adjacent to the edge of the roof . Alternativley a cross beam may be attached to the counter balance members at some point further back away from the edge of the roof (e.g. rearweardly away from the position of attachment of the masts to the counter balance members). The cross beams may of course be releasably attached if so desired. With any cross beams in place the masts may be pivoted upwardly or forwardly about each respective pivot point until the masts are in their working masts position (e.g. in a raised position with the booms extending forwardly over and beyond the edge of the roof). Once in the working position the masts are lockingly (e.g. releasably) attached to the counter balance members at the respective locking points, i.e. such the masts are no longer able to pivot about the pivot point. As may be understood in this manner a worker may install the support right at the edge of the roof without the need to hang out over the edge of the roof in order to install the booms (and cross beams if any). Installation at the roof edge avoids having to have to displace an erected heavy support across the roof surface with the attendant possibility of damaging the roof surface as the support is positioned against the roof edge and also avoids exposing a worker to the danger of falling over the edge of the roof when displacing the support to the roof edge.

If desired, the booms may also be attached or be attachable to the mast in a similar or analogous fashion, i.e. a each boom may be attached to a respective mast at a pivot point such that when the boom is only attached to said mast at said pivot point, the boom is able to pivot about said pivot point between an extended working boom position and a non-working boom position. The working boom position could for example be one wherein the boom is maintained in place by being seated on a relatively small support projecting forwardly of the mast, i.e. on an L-shaped angle element removably attached to the mast by one leg thereof while being able to support the boom by the other leg. The non-working boom position could for example be one wherein the boom is able to be pivoted such that it is more or less in line with the longitudinal axis of the mast such that the mast/boom could be folded into a flattened V configuration for transport and/or storage. The boom may of course alternatively be pivotally attached in a removable fashion such that the boom may be detached from the mast for transport and/or storage.

As mentioned above, various elements of a support may be releasably attached to each other. Thus the present invention also provides a kit for the construction of a rebuildable support for hanging an object, said kit comprising two masts, two booms, each boom being releasably attachable to a respective mast so as to extending forwardly therefrom, and a stabilizing component for maintaining the support in a working disposition, said stabilizing component comprising two counter balance members and a cross beam component for releasably interconnecting two spaced apart mast/boom/balance combinations such that said combinations are spaced apart, each counter balance member being releaseably attachable to a respective mast so as to extend rearwardly therefrom, each said counter balance member comprising counterweight means, each mast/boom/balance combination comprising a mast, a boom, and a counter balance member.

The kit may have a stabilizing component wherein the cross beam component thereof comprises one, two or more cross beams, e.g. for providing rigidity to the support. The kit may for example have a cross beam which is releasably attachable to the booms such that the masts and booms are spaced apart. Alternatively, or additionally, if desired or if necessary, the cross beam component may comprise, one or more cross beams releasably attachable between the masts, and/or between the counter balance members.

Each boom may be releasably attachable to a respective mast. Each mast may be releasably attachable to a respective counter balance member at the above described first (e.g. forward) releasable lock point and a second (e.g. rearward) releasable pivot point such that when the lock point is released the mast is able to pivot rearwardly about the pivot point. Thus, each mast may, for example, be releasably attachable to a respective counter balance member in a working mast position at a forward releasable lock point on the counter balance member; each mast may also be releasably attachable to a respective counter balance member at a rearward releasable pivot point on the counter balance member such that when the mast is only attached to said counter balance member at said pivot point, the mast is able to pivot about said pivot point between said raised working mast position and a rearward non-working mast position.

The present invention in another aspect, provides a support for engaging a wall for hanging an object, said wall having two opposed faces, said support comprising a mast component for engaging one of the faces of the wall, a boom component attached to and extending from said mast component, and a stabilizing component for maintaining the support in a working disposition, said stabilizing component comprising a foot component attached to said boom component for engaging the other face of the wall, said mast, boom, and foot components being disposed and configured such that when said support, supports an object, said mast component is able to be urged towards said one face and said foot component is able to be towards said other face for maintaining the support in a working disposition.

The boom component for the wall engaging support may comprise a tail part and a forward part. The tail part may be attached (e.g. releasably attached) to the mast component; the tail part may be releasably attached to the forward part; and the foot part may be releasably attached to the forward part. The tail part and the mast component may be configured such that said tail part is releasably attachable to said mast component at a plurality of vertical positions on said mast component. The tail part and the forward part may be configured such that said forward part is releasably attachable to said tail part at a plurality of positions for altering or adjusting the horizontal distance between the mast component and said foot part.

The wall engaging support may comprise comprising boom hanging means for engaging an object, said mast component, said boom component, said foot component, and said boom hanging means being configured and being disposed such that said boom hanging means is able to engage an object such that the object is able to hang from said boom component.

The present invention further provides a support for engaging a wall for hanging an object, said wall having two opposed faces, said support comprising

- two spaced apart mast elements for engaging one of the faces of the wall,
- two spaced apart booms, each boom being attached to and extending from a respective mast, and
- a stabilizing component for maintaining the support in a working disposition, said stabilizing component comprising two foot elements, each foot element being attached to a respective boom for engaging the other face of the wall, and a cross beam component for releasably interconnecting two spaced apart mast/boom/foot combinations, each mast/boom/foot combination comprising a mast, a boom, and a foot element, said mast elements, said booms, and said foot elements being disposed and configured such that when said support, supports an object, said mast elements are able to be urged towards said one face and said foot elements are able to be urged towards said other face for maintaining the support in a working disposition.

A wall engaging support as described above defined may comprise booms wherein each boom comprise a tail element and a forward element. The tail element may be releasably attached to a respective mast element. The tail element may be releasably attached to the forward element. The foot element may be releasably attached to the forward element. The tail element and a respective mast element may be configured such that the tail element is releasably attachable to the mast element at a plurality of vertical positions on said mast element, i.e. so as to be able to adjust the height of the tail element. The tail element and the forward element may, as desired, also be configured such that the forward element is releasably attachable to the tail element at a plurality of positions for altering or adjusting the horizontal distance between the respective mast element and the foot element. Each of the elements of the support may as desired be releasably attached to the other, e.g. if the support is built up from a kit as described herein. The support may comprise a cross beam component as described above, namely one two or more cross beams. Thus for example a cross beam may be attached to the forward elements, i.e. to provide additional rigidity to the support.

The present invention also provides a kit for the wall engaging support. Thus the present invention provides a kit for the construction of a rebuildable support for engaging a wall for hanging an object, said wall having two opposed faces, said kit comprising

- two mast elements for engaging the inner face of the wall,
- two booms, each boom being releasably attachable to a respective mast such that the boom is able to extend from said mast, and
- a stabilizing component for maintaining the support in a working disposition, said stabilizing component comprising

- two foot elements, each foot element being releasably attachable to a respective boom for engaging said outer face of the wall under said boom, and
- a cross beam component for releasably interconnecting two spaced apart mast/boom/foot combinations, each mast/boom/foot combination comprising a mast, a boom, and a foot element, said mast elements, said booms and said foot elements being configured and being disposable such that when said support supports a chute said mast elements are able to be urged towards said inner face and said foot components are able to be urged towards said outer face for maintaining the support in a working disposition.

As mentioned above each of the booms of a wall engaging support may comprise a tail element and a forward element. For the kit the tail element is releasably attachable to a respective mast; the tail element is releasably attachable to said forward element; the foot element component is releasably attachable to the forward element; the tail element and a respective mast are configured such that said tail element is releasably attachable to said mast component at a plurality of vertical positions on said mast; the tail element and the forward element are configured such that said forward element is releasably attachable to said tail element at a plurality of positions for altering the horizontal distance between the respective mast and said foot element; and the kit may comprise a stabilizing component comprising one or more cross beams such as for example a cross beam releasably attachable to said forward elements such that said mast elements and said booms are spaced apart.

A kit as well as an above described support may comprise an above mentioned boom hanging means for engaging an object, as mentioned above the mast component, boom component, balance/foot component, and the boom hanging means are configured and disposed such that the boom hanging means is able to engage an object such that the object is able to hang from the boom component.

The object to be supported may for example comprise a chute which is to be hung in an upwardly extending working position. The chute may for example be a debris chute and may for example take on the form as described in U.S. Pat. No. 5,472,768. The chute may for example comprise one or more chute sections such as illustrated for example in above mentioned U.S. patent the entire contents of which are incorporated herein by reference.

The present invention in a further general aspect provides a hoist system for raising and lowering an object such as for example a chute, roofing equipment, furniture, etc.

The hoist system generally comprises a lifting pole which is removably attached to a support as described herein. Thus the support, as described above, may comprise:

- a mast component,
- a boom component extending forwardly from said mast component, and
- a stabilizing component for maintaining the support in a working disposition.

The lifting pole on the other hand may comprise:

- an arm member, and a winch element attached to the arm member (i.e. releasably or permanently) for playing out and reeling in a rope (e.g. a wire rope, cable or the like) for the respective lowering and raising of an object.

The arm member comprises a guide element for engaging the rope when the rope is played out or reeled in by the winch element, the guide element being spaced apart from said winch element. The lifting pole is (directly or indirectly) connected (e.g. is releasably connected or attached to) the mast component.. The mast component, the boom component and the arm member are configured and disposed such that the arm member is able to engage (e.g. releasably engage) the boom component such that the lifting pole is able to raise or lower an object.

The lifting pole may be pivotally connected to the mast component such that the arm member is pivotable towards and away from engagement with the boom component.

The lifting pole, when in a working position, may be disposed such that the arm member, for example, is inclined upwardly. The arm member may alternatively, if desired, be disposed so as to be more or less horizontal.

The guide element of the arm member may take on any desired form provided that the guide element engages the rope such that the rope may be played out or reeled in by the winch element. The guide element may for example be a simple groove at one end of the arm member. In this case the rope may slide over the surface of the groove. In order to decrease frictional contact between the guide element and the rope such a groove may be provide with a suitable lubricant (e.g. graphite powder) or the groove may be provided with roller bearing members (e.g. at the bottom thereof) able to turn about themselves as the rope engages the surface thereof The guide element may in particular comprise a sheave element attached to the arm member for engaging said rope Any suitable (known) winch mechanism may be used for the winch element.

The object may, as mentioned above, be a chute and the system may be one for raising and lowering the chute respectively to and from an upwardly extending working position. The lifting pole may comprise a load spreader bar member attached to the rope. The spreader bar member may for example comprise at least two spaced apart rope attachment elements for releasable attachment of the spreader bar member to the chute.

In accordance with the present invention the lifting pole may be used to hoist a tubular debris chute and may thus comprise a chute attachment member for releasably attaching a debris chute of tubular configuration to the rope for the raising and lowering thereof.

As mentioned above, the object may be a chute and the system may be for raising and lowering the chute respectively to and from an upwardly extending working position. The system may comprise boom chute hanging means for releaseably engaging the chute such that a raised chute is able to hang from said boom component in said working position.

The stabilizing component may, as described herein, comprise a counter balance component which may be attached (e.g. releasably) to the mast component and extend rearwardly therefrom. The stabilizing component may comprise a cross beam component as herein described; any cross beam may be releasably connected or attached to other elements of the hoist system. The stabilizing component, as described herein, is for maintaining the support in a working disposition.

The present invention more particularly provides a hoist system for raising and lowering an object, said system comprising a lifting pole releasably attached to a support, said support comprising
- two spaced apart masts,
- two spaced apart booms, each boom being attached to and extending forwardly from a respective mast, and
- a stabilizing component for maintaining the support in a working disposition, said stabilizing component comprising
- a first cross beam attached to said masts,
- a second cross beam attached to said booms, and
- two counter balance members, each counter balance member being attached to and extending rearwardly from a respective mast, said lifting pole comprising
- an arm member, and
- a winch element attached to said arm member for playing out and reeling in a rope for the respective lowering and raising of said object,
- said arm member comprising a guide element for engaging said rope when the rope is played out or reeled in by the winch element, said guide element being spaced apart from said winch element said lifting pole being (directly or indirecty) releasably connected (e.g. by releasable attachment means) to said masts, said first cross beam, said second cross beam, and said arm member being configured and disposed such that the arm member is inclined upwardly from the first cross beam and the arm member engages (e.g. releasably engages) said second cross beam such that said lifting pole is able to raise or lower said object. The lifting pole may, for example, be indirectly connected to said masts by being, releasably or fixedly, attached or connected to said first cross beam which in turn is connected to said masts, the first cross beam being releasably connected or attached to the masts.

As mentioned above, it is to be understood herein that a working disposition includes, for example, the case when the booms extend out into the air (e.g. beyond the edge of a roof surface) but are not supporting an object (e.g. a chute) as well as when such booms are attached to an object (e.g. chute). Thus the counter balance members are configured so as to be able to counter balance or counteract the weight of the overhanging boom component and as well as that of the object which is intended to be hung from the boom component. For example, if such a support is disposed on a roof surface adjacent the edge thereof the counter balance members are configured such that the center of gravity of the support alone as well as the center of gravity of the support and an object attached to the support is disposed over the roof surface (preferably, as far from the roof edge as possible).

The counter balance members may, for example, comprise counter weight means. The counter weight means may comprise one or more removeable or replaceable counter weight elements, e.g. one or more weight elements which are for example seated on a tail element of a counter balance member which extends rearwardly of a respective mast.

As mentioned above the guide element may for example comprise a sheave for engaging the rope. The arm member may releasably rest against the second cross beam such that the lifting pole is able to raise or lower the object.

In accordance with the present invention, the first cross beam may have a longitudinal axis and the lifting pole may be pivotable or rotatable about such axis. The pivotal action may be accomplished in any desired fashion.

The lifting pole and first cross beam combination may advantageously be such that the arm member is pivotable about the longitudinal axis of the first cross beam towards and away from the second cross beam. Such an arrangement facilitates the attachment of the lifting pole to the first cross beam since the lifting pole may, for example, be attached from underneath the first cross beam with the arm member pointed rearwardly and downwardly. Once the lifting pole is so attached to the first cross beam, the lifting pole may simply be flipped over into its working position, e.g. the lifting pole arm member is pivoted about the longitudinal axis until it engages the second cross member such that the arm member is inclined upwardly from the first cross beam. Such an arrangement also facilitates the removal of the lifting pole once an object such as a chute is hung in place onto the support, i.e. to provide a freer access to the upper chute opening for the discharge of debris for example. The steps for the removal of the lifting pole are the reverse of those used to install it in place. The arm member is pivoted away from engagement with the second cross beam until the arm member is inclined downwardly from the first cross beam and the lifting pole is again underneath the first cross beam at which point the lifting pole is detached from the first cross beam and taken away.

The lifting pole may be attached to the first cross beam in any desired manner such that the arm member is pivotable or rotatable the longitudinal axis of the first cross beam towards and away from the second cross beam. The first cross beam may, for example, be pivotally attached to the masts such that the first cross beam is itself pivotable about its longitudinal axis (e.g. by pivot attachment means). In this case, the lifting pole may be fixed to the so pivotable first cross beam such that the arm member is pivotable about the longitudinal axis of the first cross beam towards and away from the second cross beam.

Thus, for example, the first cross beam may be pivotally connected to the masts by using a first cross beam of circular cross section along with sleeve members also of circular cross section. The sleeve members may be fixed to respective masts. The inner diameter of the sleeves is larger than the outer diameter of the cross beam such that the cross beam may be engaged in the sleeves such that the cross beam is rotatable within the sleeves about the longitudinal axis of the cross beam. Thus when the lifting pole is connected in a fixed or rigid manner to the first cross beam, the arm member is nevertheless pivotable about the longitudinal axis of said first cross beam means towards and away from said second cross beam.

Alternatively, the first cross beam may be non-rotatably fixed to the masts. The lifting pole component may be pivotally attached to such non-pivoting first cross beam such that said arm member is nevertheless pivotable or rotatable about the longitudinal axis of the first cross beam towards and away from the second cross beam. In this case the lifting pole may be pivotally connected to the first cross beam by a pivot connector member such that the arm member is pivotable about the longitudinal axis of the first cross beam towards and away from said second cross beam, e.g. the lifting pole may be fixed to a sleeve element through which the first cross beam extends. The sleeve element be configured relative to the first cross beam such that the sleeve is rotatable about the longitudinal axis of the cross beam, e.g. the sleeve may have tubular configuration of circular cross section and the cross beam may also have a circular cross section, the inner diameter of the sleeve being larger than the outer diameter of the cross beam such that the sleeve is rotatable about the longitudinal axis of the cross beam.

The counter balance members may be configured such that they are releasably attachable for example to a roof or floor surface by some sort of attachment means such as nails, bolts and the like. However as already mentioned hereinabove each of the counter balance members may comprise counterweight means, i.e. the use of such weights avoids the possibility of having to damage a roof or floor surface by for example nailing the support thereto.

As mentioned above the object may be a chute and the lifting pole may comprise a load spreader bar member as described above. The support of the system may also include as mentioned above, a boom chute hanging means associated with the booms for releasably engaging the chute such that a raised chute is able to hang from said booms in said working position.

The hoist system may include a support as described above wherein each mast is attached to a respective counter balance member in a working mast position at a first (e.g. forward) releasable lock point on the counter balance member and at a second (e.g. rearward) pivot point on the counter balance member such that when the mast is only attached to the counter balance member at the pivot point, the mast is able to pivot about the pivot point between the working mast position and a rearward non-working mast position.

The present invention also provides a kit for the construction of a rebuildable hoist system for lifting and lowering an object, said kit comprising a support component, and a lifting pole component, said support component comprising two masts, two booms, each boom being releasably attachable to and extending forwardly from a respective mast (e.g. by respective releasable attachment means), and a stabilizing component for maintaining the support in a working disposition, said stabilizing component comprising a first cross beam releasably attachable (e.g. by means for releasable attachment) to said masts, a second cross beam releasably attachable (e.g. by means for releasable attachment) to said booms, said first cross beam being attachable to said masts and said second cross beam being attachable to said booms such that said masts and booms are spaced apart, and two counter balance members, each counter balance member being releasably attachable (e.g. by respective releasable attachment means) to a respective mast, each counter balance member being attachable to a respective mast so as to extend rearwardly therefrom said lifting pole component being releaseably connectable (e.g. by a respective releasable attachment means) to said masts (e.g. being releaseably connectable to said first cross beam) and comprising an arm member, and a winch element attachable (e.g. by means for releasable attachment) to said arm member for playing out and reeling in a rope for the respective lowering and raising of said chute attachment member, said arm member comprising a guide element for engaging said rope when the rope is played out or reeled in by the winch element, said guide element being spaced apart from said winch element when said winch element is attached to said arm member, said first cross beam, said second cross beam, and said arm member being configured and being disposable such that when said first cross beam is attached to said masts, said second beam is attached to said booms and said lifting pole component is connected to said masts, said arm member is inclined upwardly from said first beam and the arm member engages said second cross beam such that said lifting pole is able to raise or lower said object.

A kit as described herein may include an above mentioned guide element which may if desired comprise a sheave for engaging said rope. The arm member for the kit may be able to rest against said second cross beam such that the lifting pole is able to raise or lower said object. The kit may include a load spreader bar member releasably attachable (e.g. by a respective releasable attachment means) to the rope, the spreader bar member may as mentioned above comprise at least two spaced apart rope attachment elements for releasable attachment of the spreader bar member to the chute. The kit may also if desired include the above mentioned boom chute hanging means for releasably engaging the chute such that a raised chute is able to hang from said booms in a working chute position. The kit may include a first cross beam which is pivotally and releasably attachable (e.g. by a respective releasable attachment means) to the masts such that the first cross beam is pivotable about the longitudinal axis thereof and, wherein the lifting pole component is releasably fixable to the first cross beam such that the arm member is pivotable about the longitudinal axis of the first cross beam towards and away from said second cross beam. Alternatively, the kit may include a first cross beam which is releaseably fixable (e.g. by a respective releasable attachment means) to the masts, and wherein the lifting pole component is pivotally and releasably attachable (e.g. by a respective releasable attachment means) to the first cross beam such that the arm member is pivotable about the longitudinal axis of the first cross beam towards and away from the second cross beam.

The kit may further include counter balance members which comprise counterweight means.

The kit may for example include masts which are each releasably attachable to a respective counter balance member in a working position at an aforementioned first (e.g. forward) releasable lock point on the counter balance member and at an aforementioned second (e.g. rearward) releasable pivot point on the counter balance member such that when the mast is only attached to said counter balance member at said pivot point, the mast is able to pivot about said pivot point between said raised working position and a rearward non-working position.

As described above, a support herein may be a wall engaging support. Accordingly, the present invention also provided a hoist system for disposition in a wall opening for lifting and for lowering an object, said system comprising a lifting pole releasably attached to a support for engaging a wall, said wall having an inner face, an outer face and a wall opening interrupting said faces, said support comprising

- two spaced apart mast elements for engaging the inner face of the wall,
- two spaced apart booms, each boom being attached to and extending from a respective mast for extending out of said wall opening, and
- a stabilizing component for maintaining the support in a working disposition, said stabilizing component comprising

- two foot elements, each foot element being attached to a respective boom for engaging said outer face of the wall under said boom,
- a first cross beam attached to said mast elements, and
- a second cross beam attached to said booms, said lifting pole comprising

- an arm member, and
- a winch element attached to said arm member for playing out and reeling in a rope for the respective lowering and raising of said object,
- said arm member comprising a guide element for engaging said rope when the rope is played out or reeled in by the winch element, said guide element being spaced apart from said winch element, said mast elements, said booms and said foot elements being disposed and configured such that when said system raises or lowers an object said masts are able to be urged towards said inner face and said foot elements are able to be urged towards said outer face for maintaining the support in a working disposition, said lifting pole being releasably connected to said mast elements (e.g. being releasably connected or attached to said first cross beam), said first cross beam, said second cross beam and said arm member being configured and disposed such that said arm member is inclined upwardly from said first beam and the arm member engages (i.e. releasably engages) said second cross beam such that said lifting pole is able to raise or lower said object. As mentioned previously, the lifting pole may, for example, be indirectly connected to said masts by being attached or connected (e.g. releasably) to said first cross beam which in turn is connected to said masts, the first cross beam being releasably connected or attached to the masts.

A hoist system for engaging a wall may comprise booms wherein each of the booms comprises a tail part or element and a forward part or element as described above.

The wall engaging hoist system may for example comprise a guide element which comprises a sheave for engaging the rope. The arm member of the wall engaging system may for example comprise an elevation element whereby the arm member releasably rests against the second cross beam such that said lifting pole is inclined upwardly from said first beam and said lifting pole is able to raise or lower said object. Alternatively, for example, the arm member may be disposed so as to be able to rest against the second cross beam such that the arm member is in a more or less horizontal position; in this case the first and second cross beams may be disposed for example so as to be more or less at the same level. The hoist system may include a load spreader member as described above. The system may further include a boom chute hanging means also as described above.

The wall hoist system may advantageously be one wherein the opening may be a window and the mast elements may be configured and disposed such that the mast elements are able to engage the inner face of the wall above and below the window.

The present invention also provides a kit for the construction of a rebuildable wall engaging hoist system as described herein. Thus such a kit for the construction of a rebuildable hoist system for disposition in a wall opening for raising and for lowering an object, may comprise a lifting pole component and a support component for engaging a wall, said wall having an inner face, an outer face and a wall opening interrupting said faces, said support component comprising

- two mast elements for engaging the inner face of the wall,
- two booms, each boom being releasably attachable to a respective mast such that the boom is able to extend from said mast for extending out of said wall opening, and
- a stabilizing component for maintaining the support in a working disposition, said stabilizing component comprising two foot elements, each foot element being releasably attachable to a respective boom for engaging said outer face of the wall under said boom, a first cross beam releasably attachable to said mast elements, and a second cross beam releasably attachable to said booms, said first cross beam being attachable to said mast elements and said second cross beam being attachable to said booms such that said mast elements and said booms are spaced apart, said lifting pole component being releasably connectable to said mast elements (e.g. being releasably connectable to said first cross beam) and comprising an arm member, and a winch element attachable to said arm member for playing out and reeling in a rope for the respective lowering and raising of said chute, and said arm member comprising a guide element attached to said arm member for engaging said rope when the rope is played out or reeled in by the winch element, said guide element being spaced apart from said winch element when said winch element is attached to said arm member, said mast elements, said booms and said foot elements being configured and being disposable such that when said system raises or lowers an object said masts are able to be urged towards said inner face and said foot components are able to be urged towards said outer face for maintaining the support in a working disposition, said first cross beam, said second cross beam and said arm member being configured and being disposable such that when said lifting pole is connected to said mast elements (e.g. via said first beam), said arm member is inclined upwardly from said first beam, and the arm member releasably engages said second cross beam such that said lifting pole is able to raise or lower said object.

The kit for a wall engaging hoist system may comprise booms which comprise a tail element and a forward element as described herein, the elements being releasably attachable one to the other as mentioned above. The kit may include other elements of the system such as a sheave for engaging said rope, i.e. as a guide element. The arm component may comprise an elevation element whereby the arm member is able to releasably rest against said second cross beam such that the lifting pole inclined upwardly from said first cross beam and the lifting pole is able to raise or lower said object. The kit may include a load spreader bar member when the object to be raised or lowered is a chute. The kit may comprises boom chute hanging means for engaging the chute such that a raised chute is able to hang from said booms in said working position.

The opening for a wall engaging support or hoist system may as mentioned be a window. The mast elements may be configured and disposed such that the mast elements are able to engage the inner face of the wall above the window, below the window, to the sides of the window or some combination of such surfaces. If desired, the masts may engage the inner face of the wall above and below the window. If for example the masts alternatively engage the inner face of the wall only above the window the booms may for example rest on the window sill for additional support.

In the drawing which illustrate example embodiments of the present invention:

FIG. 19 is an enlarged partial side view showing the connection of the mast to the forward end portion of the counter balance member of the support shown in FIG. 1, the mast being in an upwardly extending working mast position;

Figure 1:
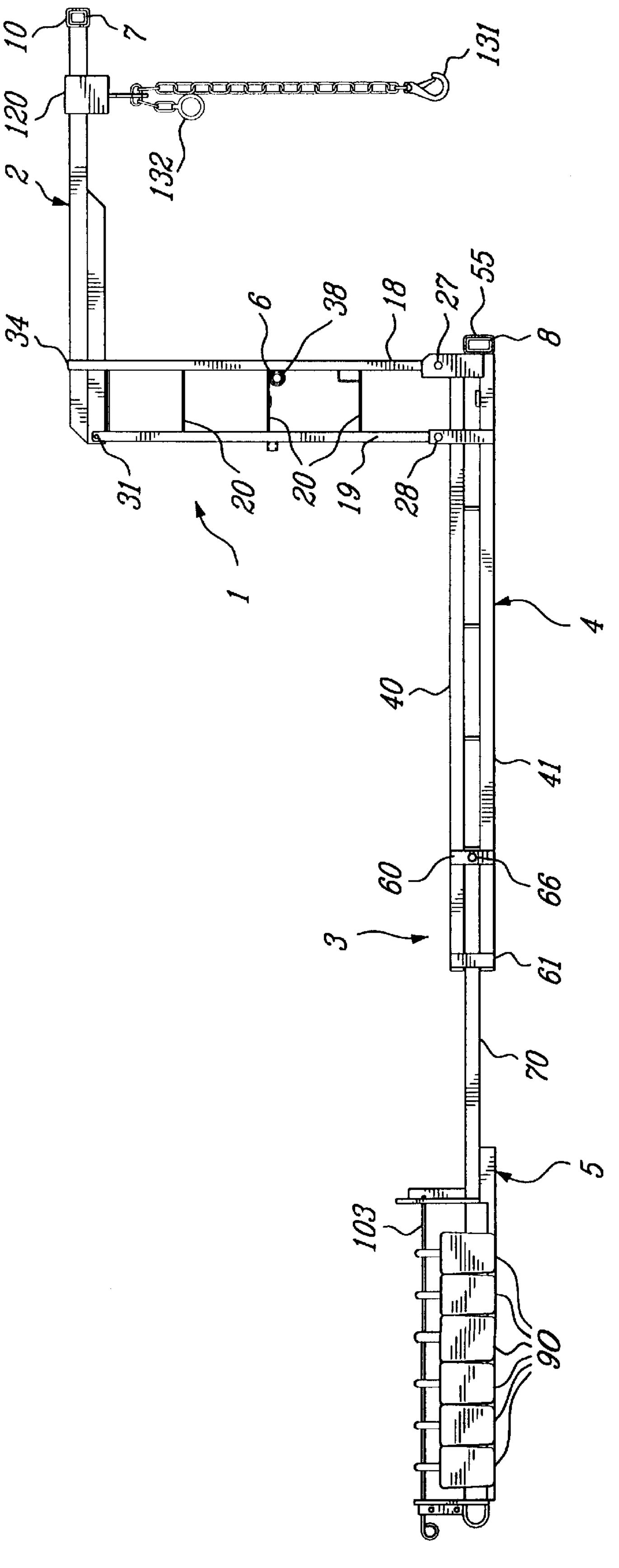
FIG. 1 is a side view of an example embodiment of a support in accordance with the present invention which may be installed on a roof to support a debris chute in an upwardly extending working position.
Figures 31, 32:
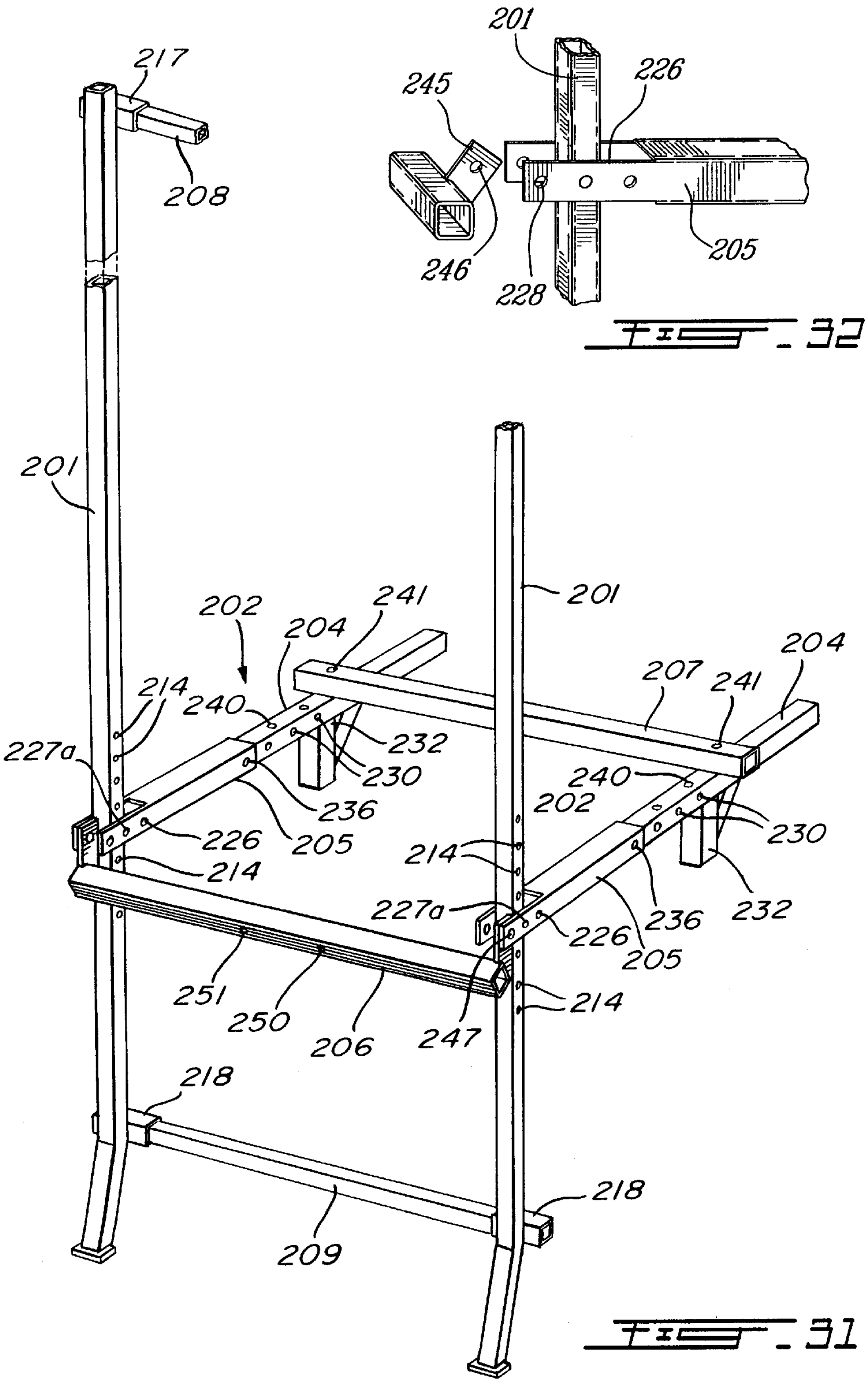
FIG. 31 is a schematic perspective illustration of part of the support as shown in FIG. 30 with the wall removed.
FIG. 32 is a schematic partial view of a first cross beam being positioned to be attached to the tail element of a wall support boom.
Figure 33:
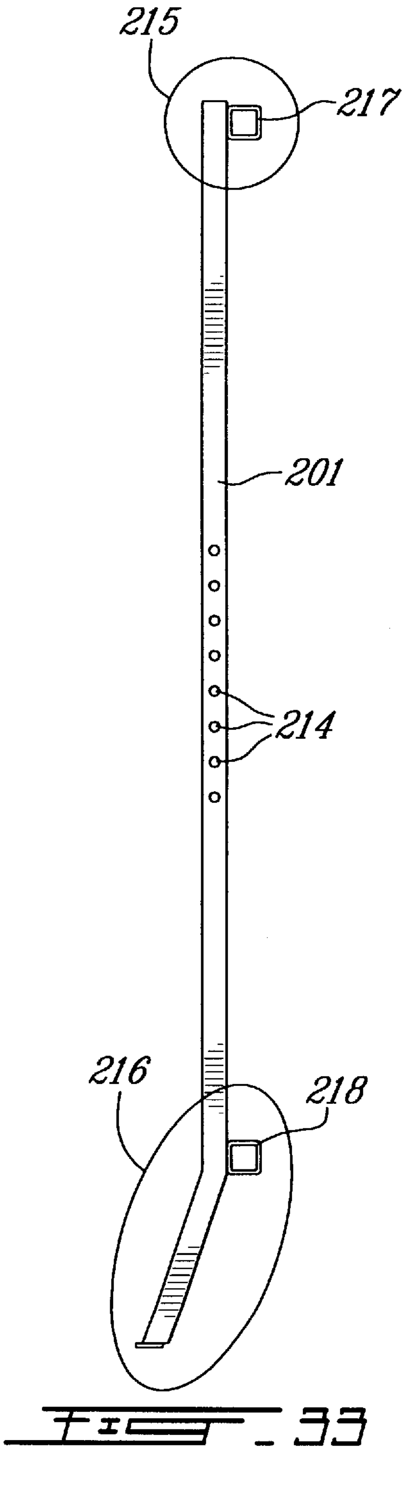
FIG. 33 is a side view of a mast of a wall support as shown in FIG. 31.
Figure 36:
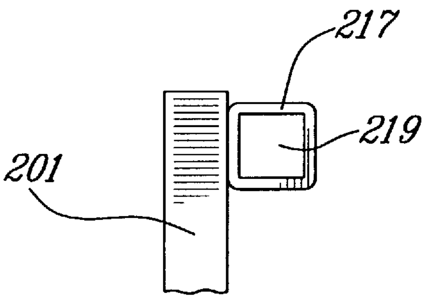
FIG. 36 is an enlarged view of the upper end of the mast shown in FIG. 33.
Figure 35:
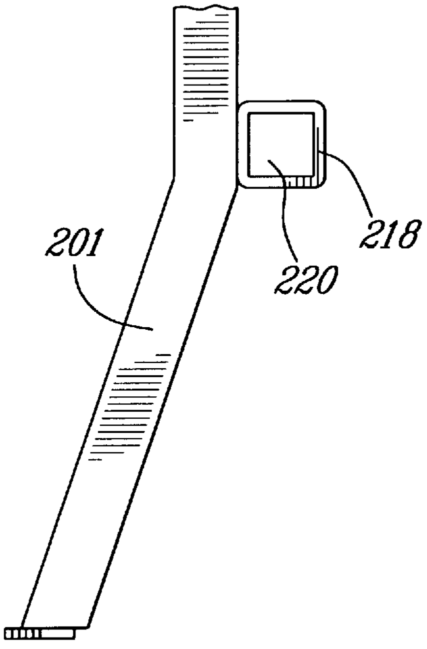
FIG. 35 is an enlarged view of the lower end of the mast shown in FIG. 33.
Figure 34:
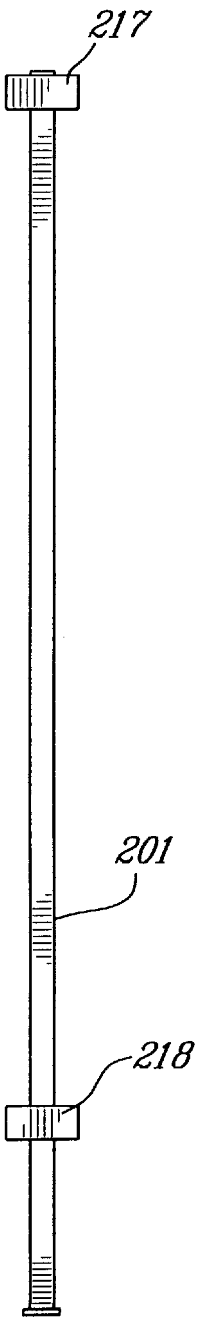
FIG. 34 is a front view of the mast shown in FIG. 33.
Figure 42:
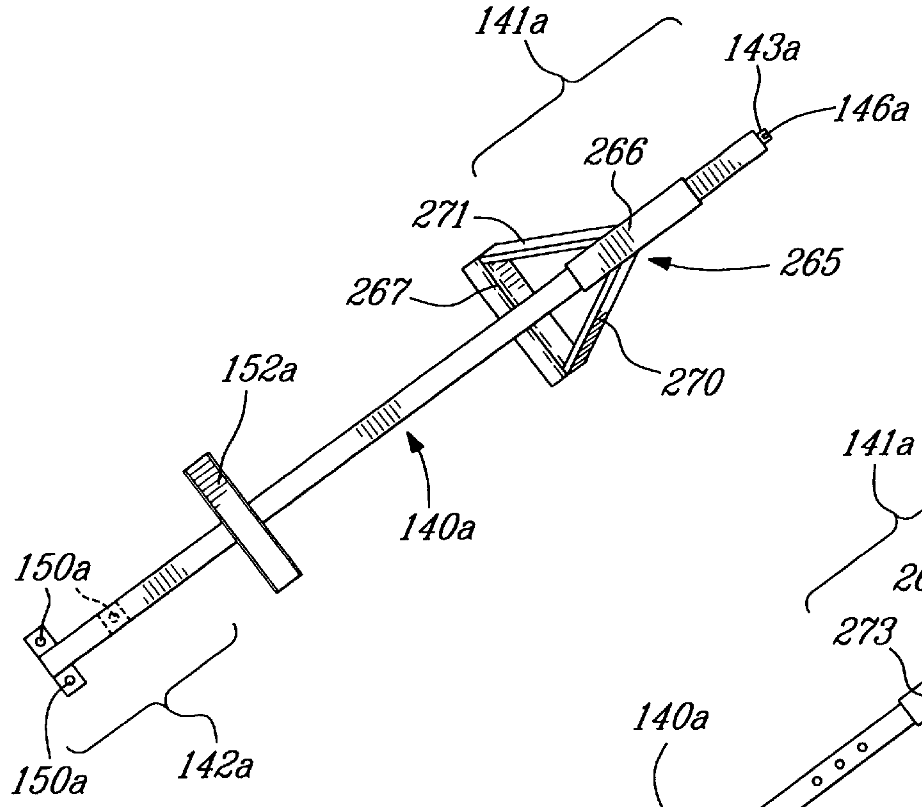
FIG. 42 is a top view of an example embodiment of a lifting pole for use with a wall support as shown in FIG. 31.
Figure 43:
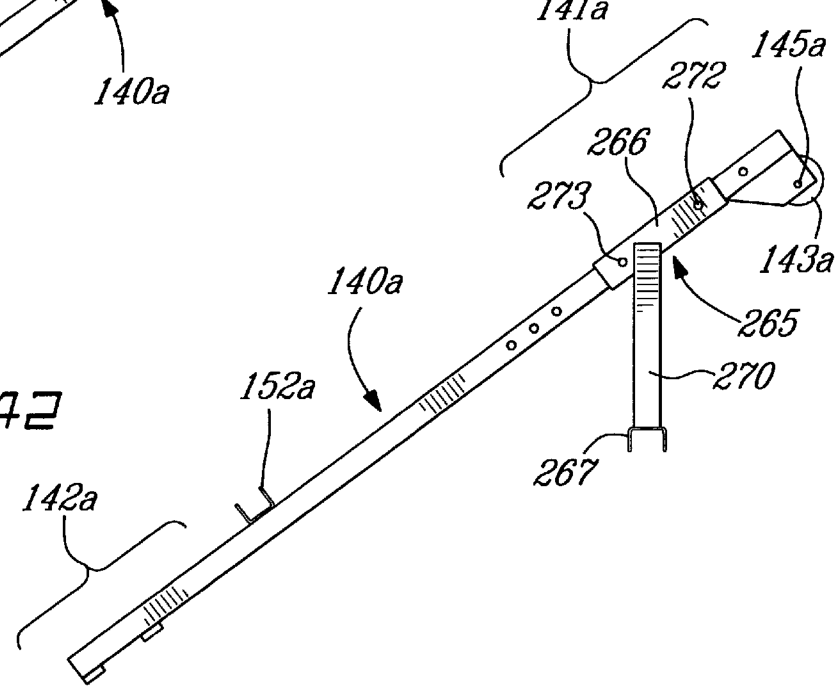
FIG. 43 is a side view of the lifting pole shown in FIG. 42.
Figure 44:
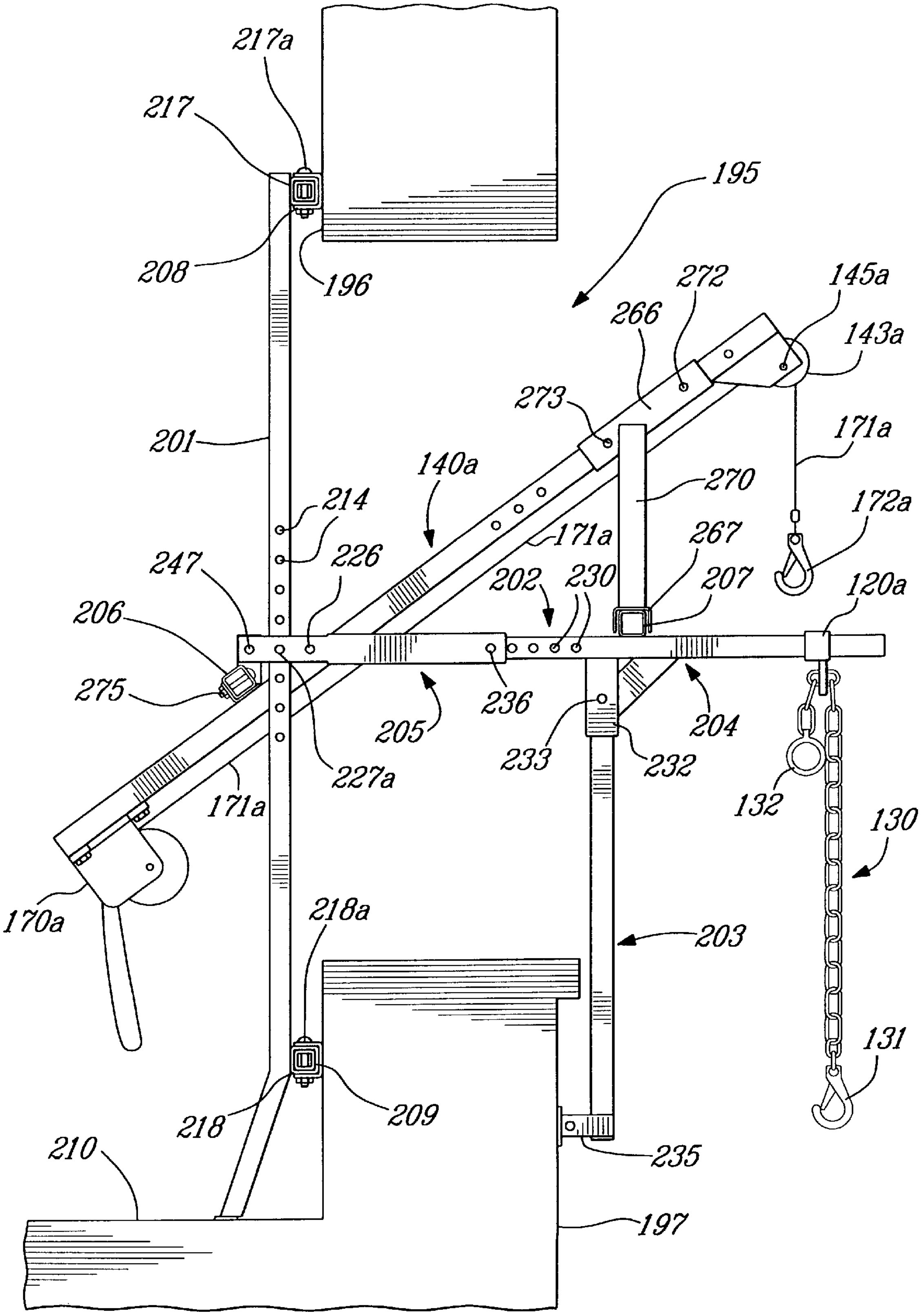
Figure 45:
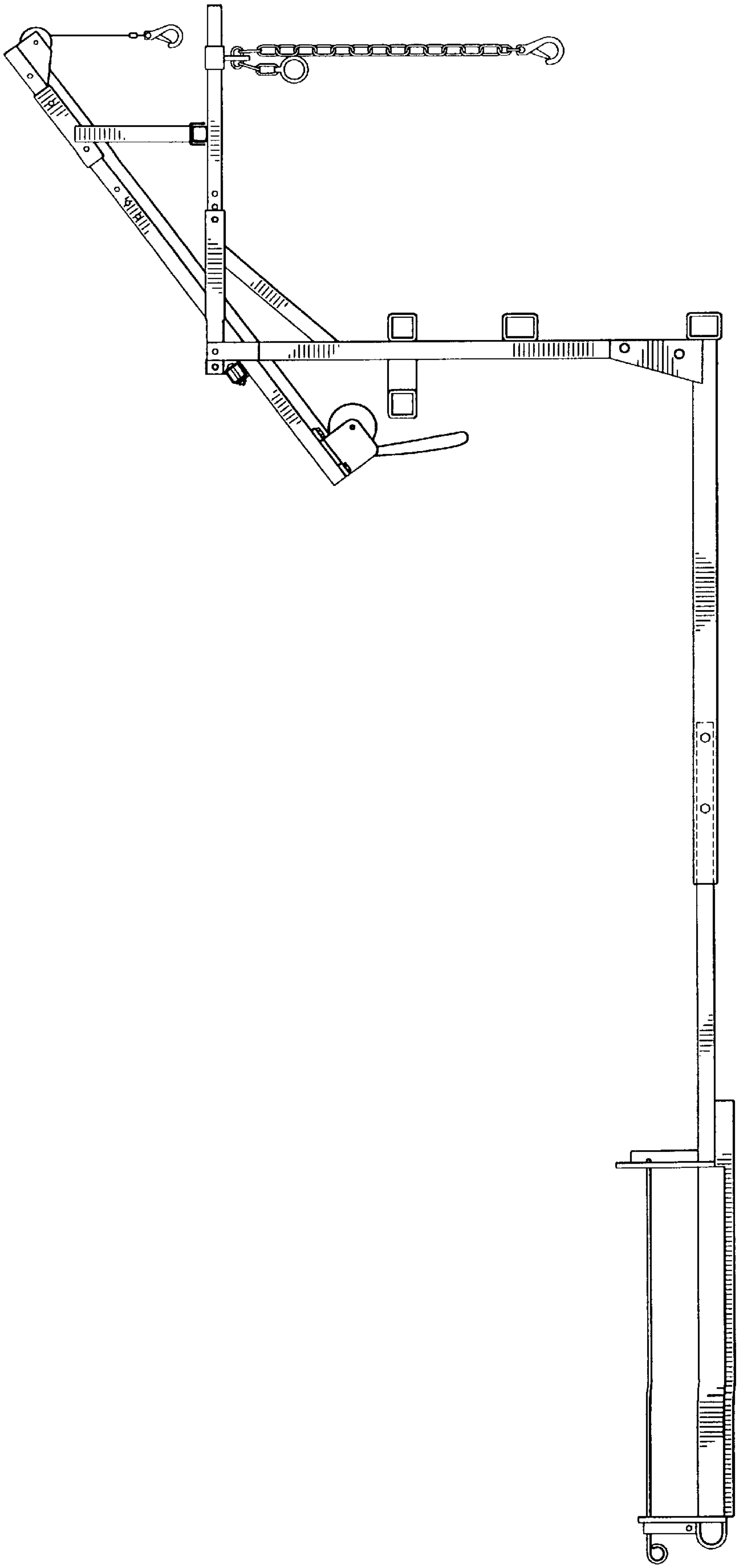

FIG. 44 is a schematic illustration of a side view of an embodiment of a wall hoist system in accordance with the present invention comprising the wall support of FIG. 31 and the lifting pole of FIG. 42; and FIG. 45 is a schematic illustration of a side view of a hybrid embodiment of a hoist system in accordance with the present invention comprising the support of FIG. 1 and the lifting pole of FIG. 43.

Figure 2:
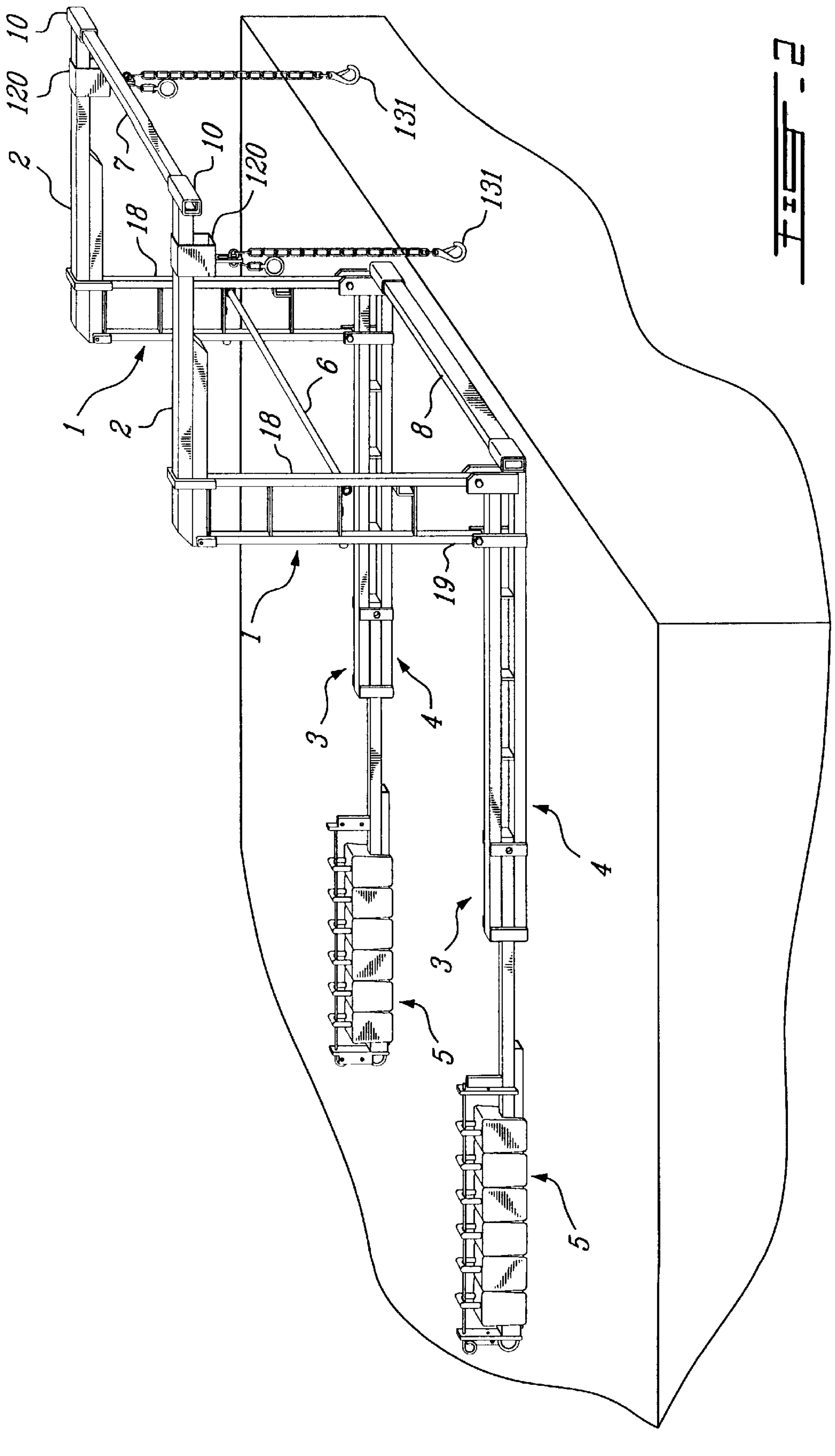
FIG. 2 is a perspective view of the support shown in FIG. 1.
Figure 3:
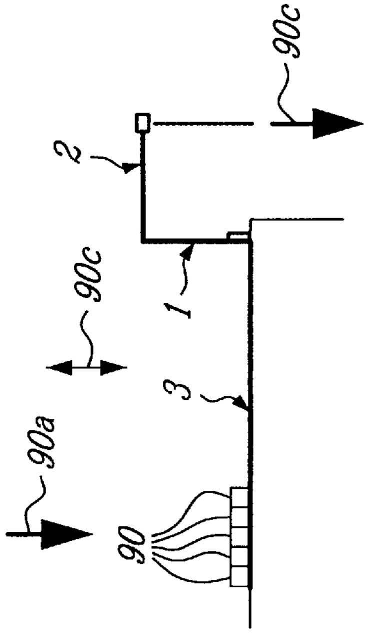
FIG. 3 is a schematic illustration in side view of the support shown in FIG. 1 showing the counter balancing action of the counter balance member in relation to the force exerted by a chute attached to the booms.

FIGS. 1 to 3 illustrate an example embodiment of a support in accordance with the present invention; elements of the support are releasably attached (e.g. by bolt/nut combinations) such that the support can be broken down for transport or storage, i.e. the support may be reduced to a support kit.

In FIGS. 1, 2 and 3 the support is shown as being installed on the surface of a roof near the roof edge. The support may be used for supporting a chute in an upwardly extending working position along the side wall of a building for funneling debris from the roof and/or, if the chute is provided with lower intermediate openings, from other lower floors of the building to a debris container (see for example FIG. 29). If desired the support could of course be appropriately sized so as to be able to have the booms extend out a wall opening such as a window.

The support has two masts 1, two booms 2 and two counter balance or foot members 3. The counter balance or foot members 3 each have a forward element 4 and a rear or tail element 5 which are releasably attached to each other. The masts 1 are also each releasably attached to a respective boom 2 and a respective counter balance member 3 so as to form a mast/boom/balance combination; i.e. the support comprises a pair of mast/boom/balance combinations of the same construction. The mast/boom/balance combinations are spaced apart and are interconnected by cross beams. Thus the support also has a first cross beam 6, a second cross beam 7 and a base cross beam 8. The first cross beam 6 is releasably connected to the masts; the second cross beam 7 is releasably connected to the booms; and the base cross beam 8 is releasably connected to the ends of the forward elements of the counter balance members. Although the support is shown with two mast/boom/balance combinations, it may include other such combinations; e.g. two additional such combinations may be disposed such that the combinations shown in the figures is sandwiched between the additional outside combinations, the booms of the central pair of combinations being intended to be used to hang the chute.

The masts 1 are shown in FIGS. 1, 2 and 3 as rising vertically more or less perpendicular to the roof surface.

The masts 1 could, if so desired, extend upwardly at a non perpendicular angle to the roof surface, i.e. either forwardly to overhang the edge of the roof or rearwardly to give the support a Z-like side profile. The masts 1 are also shown as being more or less parallel to each other, they could, if so desired, be non-parallel to each other. In these cases attention, however, should particularly be paid to the strength of the mast/counter balance member connection (e.g. the support may require additional strengthening elements interconnecting the counter balance members and respective masts).

Reference will now be made to FIGS. 4 to 19 which describe the elements of a mast/boom/foot combination; the following comments of course apply to both of the mast/boom/foot combinations of the support.

Figure 4:
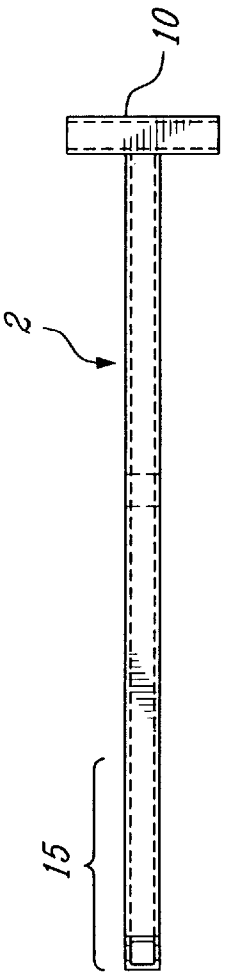
FIG. 4 is a top view if a boom element of the support shown in FIG. 1.
Figure 5:
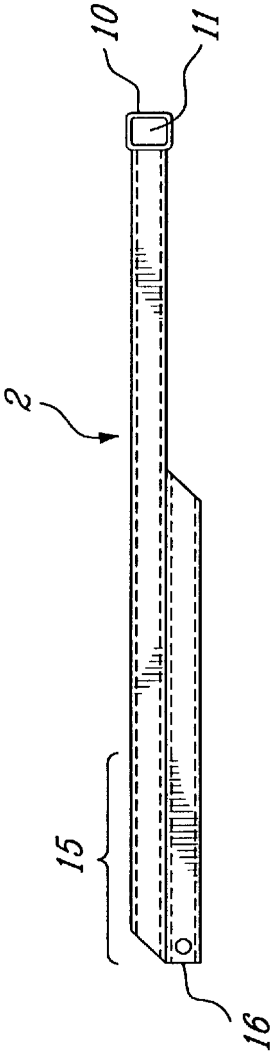
FIG. 5 is a side view of the boom element of FIG. 4.

As seen from FIGS. 4 and 5, a boom 2 comprises an elongated member which has a tubular element 10 disposed transversely at the front end thereof The tubular element 10 is hollow and has a rectangular opening 11. The opening 11 is intended to engage an end of cross beam 7. The end of cross beam 7 (not shown in FIGS. 4 and 5) intended to engage the opening 11 has a complementary rectangular cross section and is sized so as to be able to slidingly and snugly engage the interior walls of the opening 11. The opposite or distal end of the boom 2 has an end portion 15 which rectangular in cross section and is configured to slidingly engage a gripping element of the mast 1 as shall be described below, the end portion 15 is also provided with an opening 16 for receiving a bolt/nut combination for releasably attaching the boom to the mast 1. As seen from FIG. 2 a mast 1 has a ladder like configuration and comprises elongated side elements 18 and 19 which are interconnected by rung elements 20; the rung elements 20 are attached to the side dements and 19 in any suitable e.g. by welding when the support is of metal.

Figure 6:
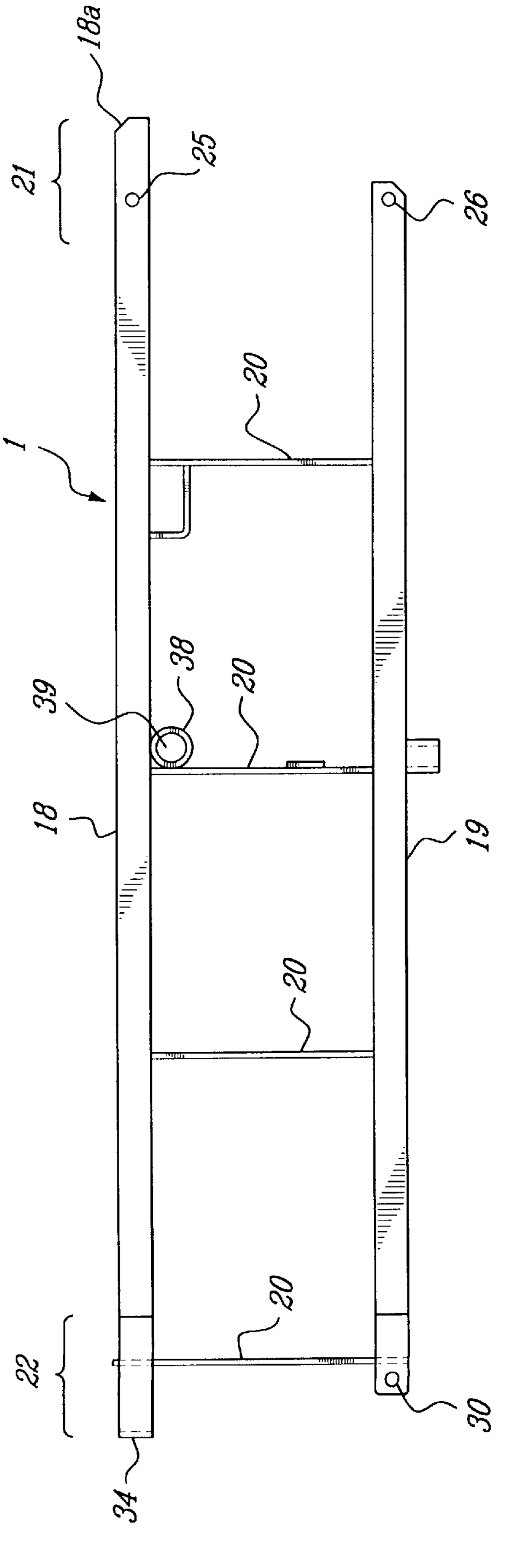
FIG. 6 is a side view of a mast element of the support shown in FIG. 1.
Figure 7:
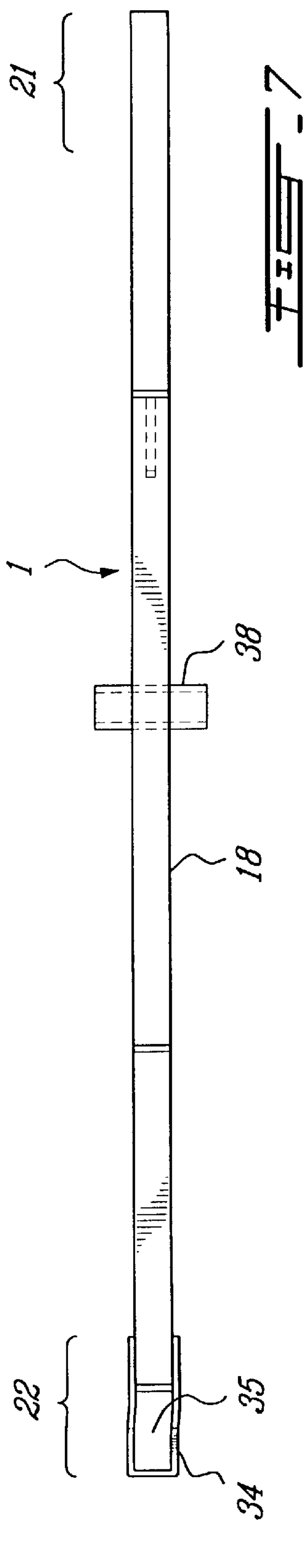
FIG. 7 is a front view of the mast shown in FIG. 6.
Figure 9:
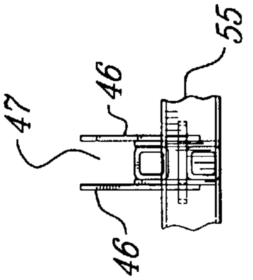
FIG. 9 is a front end view of the front part of the counter balancing member shown in FIG. 8.
Figure 8:
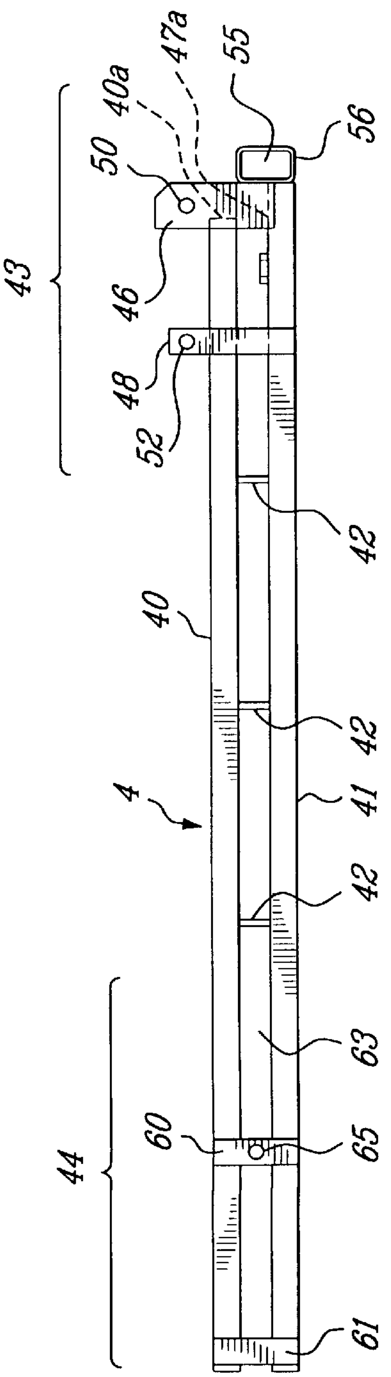
FIG. 8 is a side view of the front part of a counter balancing member of the support shown in FIG. 1.
Figure 11:
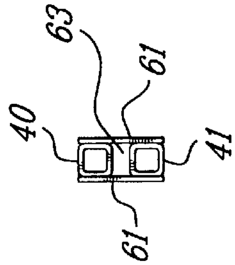
FIG. 11 is a rear end view of the front part of the counter balancing member shown in FIG. 8.
Figure 10:
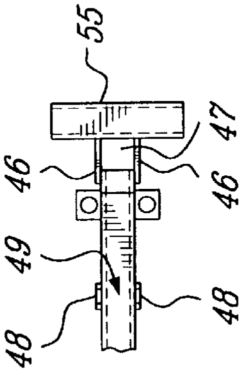
FIG. 10 is a top partial end view of the front part of the counter balancing member shown in FIG. 8.

Referring to FIGS. 6 and 7, these figures show a mast 1 in a horizontal position rather than the working vertical position shown in FIG. 2. As may be seen from FIG. 6 the side element 18 is somewhat longer than the other side element 19; the end 18*a* of element 18 extends further than the adjacent end of element 19. The mast 1 has a foot attachment end portion 21 and a boom attachment end portion 22.

The foot attachment portion 21 has openings 25 and 26 in side elements 18 and 19 respectively, for receiving a respective bolt part of a bolt/nut combination for releasably attaching the foot attachment portion to the forward end of the forward element 4 of a counter balance member 3 (bolt/nut combinations 27 and 28 are for example designated in FIG. 2).

The boom attachment end portion 22 also comprises a pair of openings 30 in respective opposed spaced apart end plates; the part of the end portion 15 of the boom 2 comprising opening 16 being able to be disposed between such plates such that the openings 16 and 30 may be aligned for receiving the bolt part of a bolt/nut combination for releasably attaching the boom 2 to mast 1 (bolt/nut combination 31 is for example designated in FIG. 2). The end portion 22 is also provide with a gripping element 34 on the side element 18. The gripping element 34 has an opening for has an opening 35 of rectangular cross section. The opening 35 is intended to engage the end portion 15 of boom 2. The opening 35 of gripping element 34 has a complementary rectangular cross section with respect to the end portion 15 of the boom 2. The opening 35 is sized such that the end portion 15 of the boom 2 is able to slidingly and snugly engage the interior walls of the opening 35.

The mast 1 has a tubular element 38 which is disposed at a central part of the mast 1. The tubular element 38 is hollow and has an opening 39 of circular cross section to engage an end of cross beam 6. The end of cross beam 6 (not shown in FIGS. 6 and 7) intended to engage the opening 39 has a complementary circular cross section and is sized so as to be able to slidingly and snugly engage the interior walls of the opening 39 such that the cross beam 6 is able to rotate therein about the longitudinal axis of the cross beam 6.

FIGS. 8 to 11 illustrate a forward element 4 of a counter balancing member 3. The forward element 4 comprises upper and lower elongated elements 40 and 41 which spaced apart and interconnected by intermediate elements 42.

The forward element 4 is provided with a forward end portion 43 and a rear end portion 44. Both portions 43 and 44 are provided with two pairs of plate elements; each plate element is attached to the each of the elongated elements 40 and 41 on a respective side thereof. The intermediate elements and the plates may for example be welded to the elongated elements 40 and 41 if the support is of metal.

The forward end portion 43 has a locking pair of spaced apart plate elements 46 which define therebetween an opening 47; and a pivot pair of spaced apart plate elements 48 which define therebetween an opening 49. The elongated element 40 has a truncated end 40*a* such that the opening 47 has a bottom part 47*a* which extends into the space between the elongated elements 40 and 41. The opening 47 is sized to slidingly and releasably accommodated the end part 18*a* of the mast 1; the opening 48 is sized to slidingly and releasably accommodate the end part of the elongated element 19 of mast 1 which is adjacent the end part 18*a* (see FIGS. 6 and 19).

The plates 46 are each provided with locking openings 50 (i.e. a locking point) which are aligned so as to receive a bolt part of the bolt/nut combination 27 (see FIGS. 2 and 19) for releasably locking the mast 1 in an erect working position.

Figure 18:
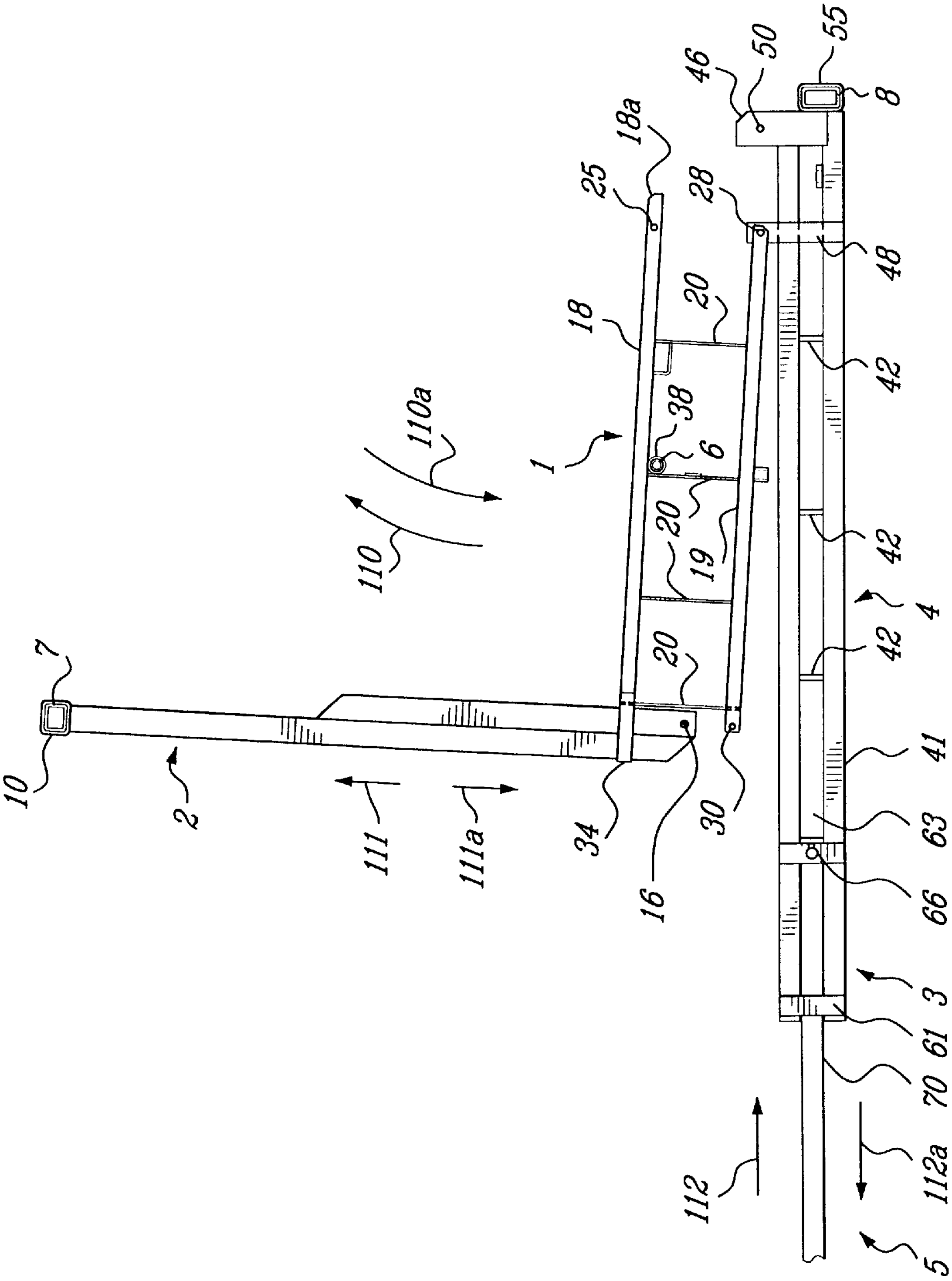
FIG. 18 is a side view of the support shown in FIG. 1 but wherein a mast is illustrated as being in a rearward non-working mast position with the mast pivotally connected to the forward end portion of the counter balance member.
Figure 10:
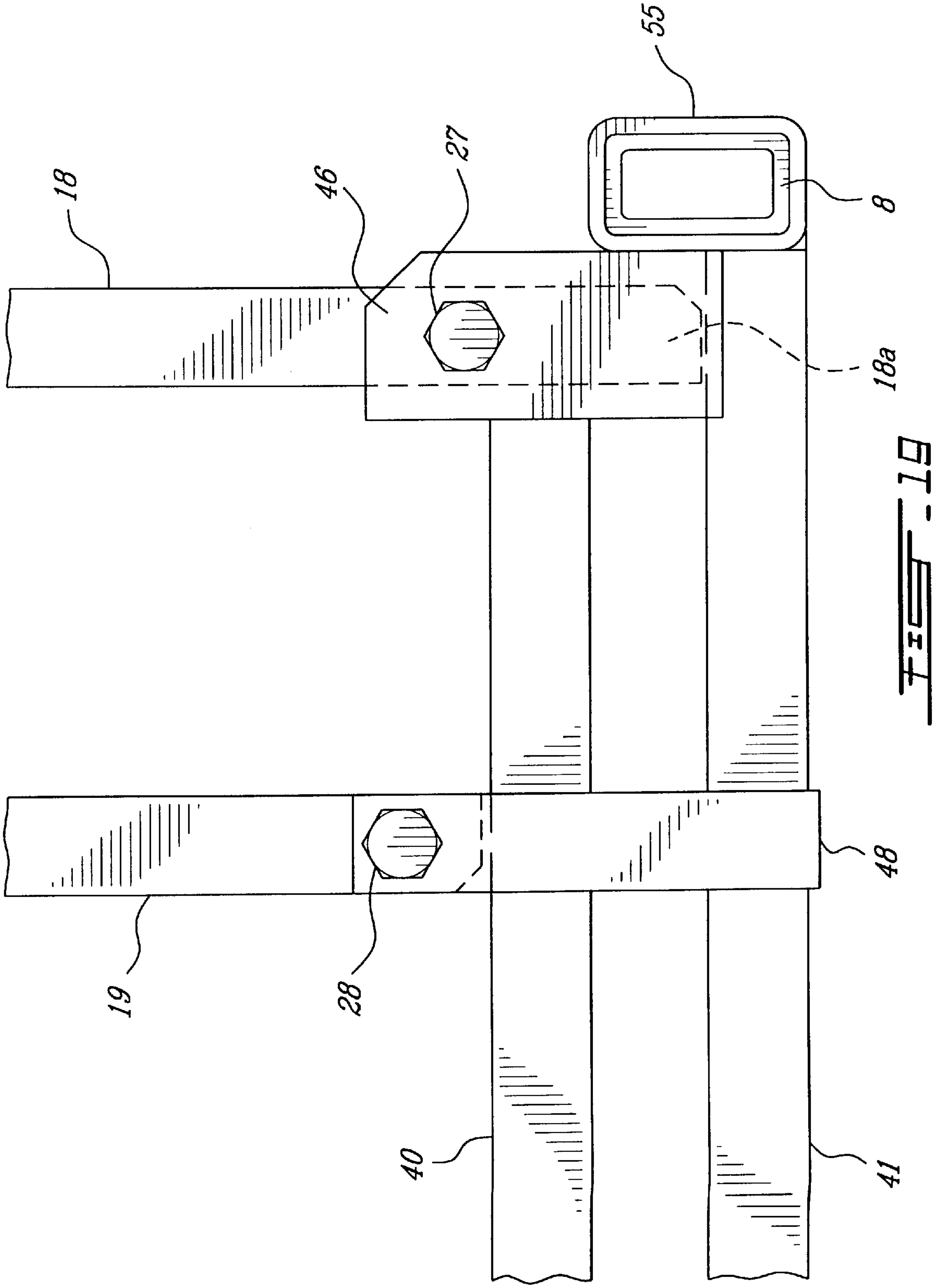

The plates 48 are each provided with pivot openings 52 (i.e. a pivot point) which are aligned so as to receive a bolt part of the bolt/nut combination 28 (see FIGS. 2 and 19) also for releasably locking the mast 1 in an erect working position but also for providing a pivot about which a mast 1 may pivot between an erect position (i.e. a working mast position) and a lowered rear position (i.e. a non-working mast position) when the mast 1 is attached only at openings 52 (see FIG. 18).

The forward end portion 43 also has a tubular or toe element 55 disposed at the front end thereof transverse to the longitudinal axis of the elongated element 40 and 41. The tubular element 55 is attached to the plates 46 and the elongated element 41. The tubular element 55 is sized such that when the forward element 4 is laid down on a surface with the lower elongated element 41 adjacent the surface, the tubular element 55 may act as a stabilizing member so as to tend to maintain the forward element 4 in an upright position with the elongated element 40 above the lower elongated element 41. The tubular element 55 is hollow and has a rectangular opening 56.

The tubular or toe element 55 may alone act to stabilize the forward element in an upright position; e.g. even if the first cross beam 6 is removed to provide easier access to an opening in a chute adjacent to the edge of the surface supporting the support, the toes 55 of the forward elements 4 may act to stabilize the support (if necessary or desired they of course may be lengthened). However, the opening 56 may as seen in FIG. 2 engage an end of base cross beam 8 in order to enhance the stabilizing effect of the tubular element 55. The end of cross bean 8 (not shown in FIGS. 8 to 11) intended to engage the opening 56 has a complementary rectangular cross section and is sized so as to be able to slidingly and snugly engage the interior walls of the opening 56.

If desired, and as an alternative, the forward element 4 need not include the tubular or toe element 55 at all. In this case the first cross beam 6 may provide the desired or necessary stability for the support. If the first cross beam 6 is to be removed so as to allow access to a chute opening as described above, the mast may be provided with a tubular element having the same configuration as element 55 but which is attached to the elongated element 18 at the foot attachment portion 21 thereof (see FIG. 7) for engagement with lower cross beam having the same configuration as the above mentioned base cross beam 8, i.e. such a lower cross beam may act as an additional first cross beam attached to the masts 1.

The end portion 44 of the forward element 4 is also provided with a two pairs of side plate element, namely side plate elements 60 and side plate elements 61. These plates may also for example be welded to the elongated member 40 and 41 if support is made of metal. The end portion 44 has an opening 63 between the elongated element 40 and 41; the opening 63 extends from the plates 61 to the first intermediate element 42 adjacent the plates 60. The plates 60 are each provided with opening 65 which are aligned so as to receive a bolt part of the bolt/nut combination 66 (see FIGS. 2 and 18) for releasably locking the tail element 5 to the forward element 4 in a working position for counter balancing the weight of the object to be supported.

Figure 12:
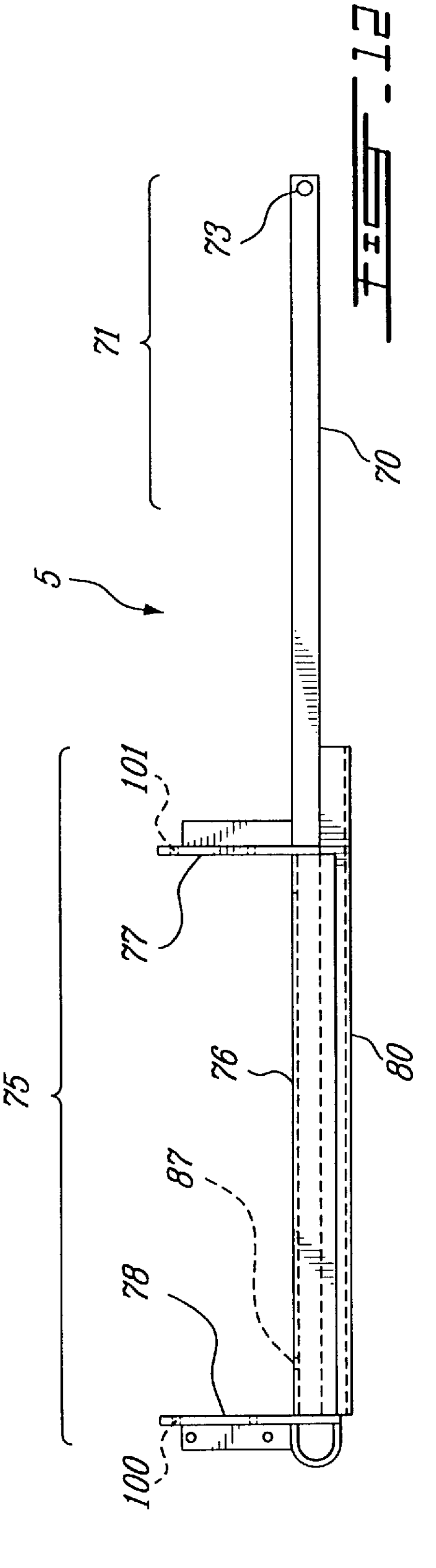
FIG. 12 is a side view of the tail part of a counter balance member shown in FIG. 1.
Figure 14:
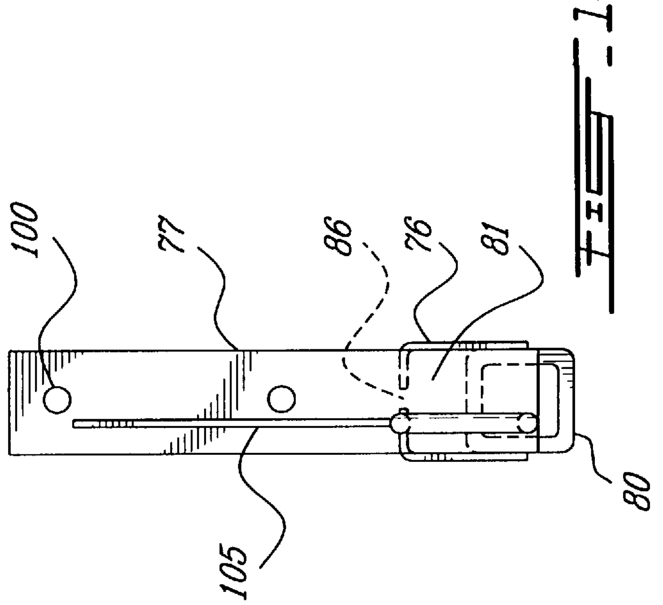
FIG. 14 is a rear end view of the tail element as shown in FIG. 13.
Figure 13:
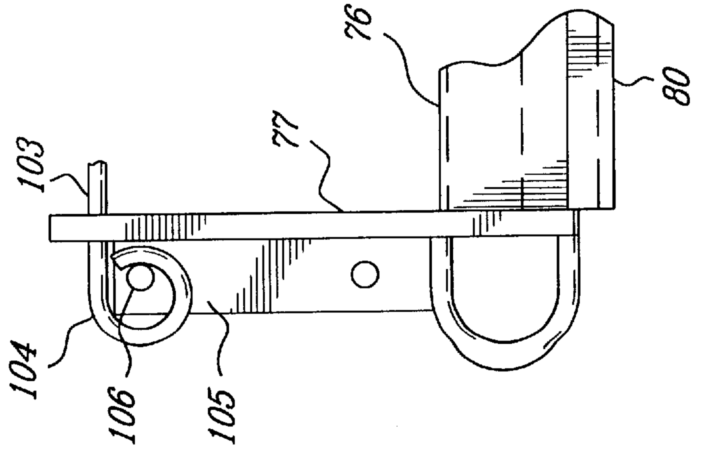
FIG. 13 is an enlarged partial side view of the rear part of the tail element shown in FIG. 12.

FIGS. 12 to 14 illustrate a tail element 5 of a counter balance member 3. The tail element 5 as seen in FIG. 12 has an extension element 70 provided with an end part 71 which is sized and configured for engaging the opening 63 of the forward element 4 (see FIG. 8). The end part 70 has an opening 73 for receiving a bolt part of the bolt/nut combination 66 (see FIGS. 2 and 18) for releasably locking the tail element 5 to the forward element 4 as mentioned above.

The tail element 5 also has an end part 75 for seating and locking in place one or more counter balance weight elements. The end part 75 comprises a seat element 76 of more or less upside down U-shape configuration disposed between opposed end elements 77 and 78. The seat element 76 is fixed to the extension element 70 (e.g. by welding). The end element 77 is fixed in place to the seat element 76 (e.g. also by welding). The end element 78 is fixed (e.g. by welding) to a support element 80 which is engaged in the downwardly extending opening of the seat element 76 (i.e. elements 76 and 80 again for example being fixed in place by welding) such that there is a space 81 defined therebetween. The support element 80 extends a short distance under the extension element 70.

The seat element 76 is provided with a longitudinal slot 86 which includes an opening 87 disposed at one end thereof which is sized larger than the width of the slot itself (see FIG. 12).

Figure 17:
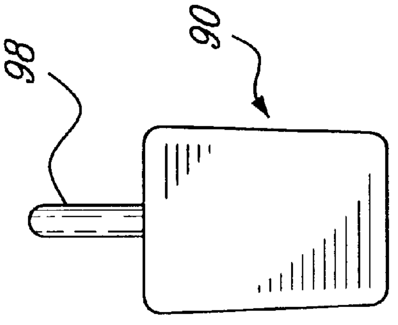
FIG. 17 is a side view of a counter weight element shown in FIG. 15.
Figure 16:
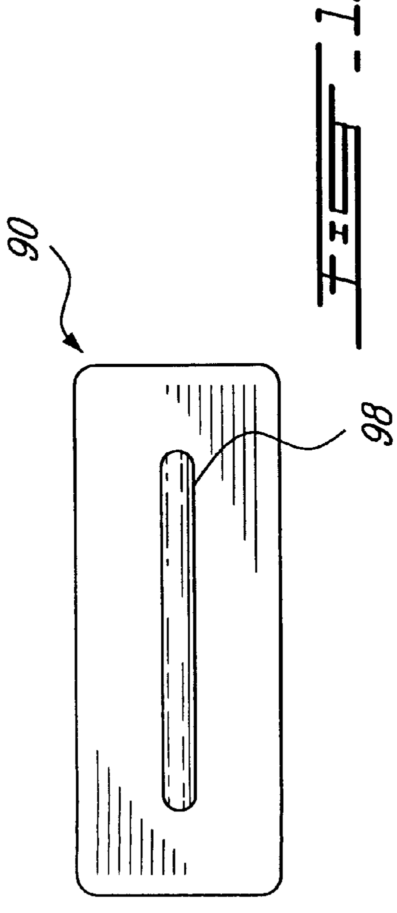
FIG. 16 is a top view of a counter weight element shown in FIG. 15.
Figure 15:
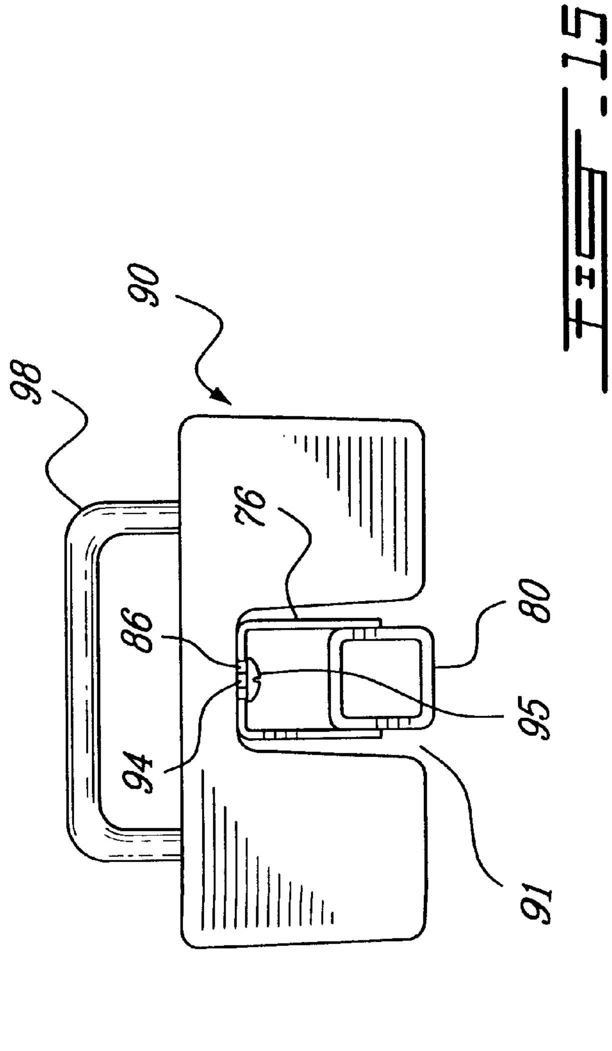
FIG. 15 is a front view of a counter weight element for resting on the tail element shown in FIG. 12.

Referring FIGS. 15 to 17, these figures illustrate an example embodiment of a counter weight element 90. FIG. 15 shows the weight element 90 seated over the seat element 76. The weight element 90 has a channel opening 91 which is sized such that the weight element 90 is able to straddle the seat element 76. The weight element is provided with an attachment member comprising a stem 94 and a head 95. The stem 94 is sized smaller than the width of the slot 86 such that the weight element may be displaced back and forth along the slot. The head 95 is sized larger than the slot but smaller then the opening 87. Thus with the attachment member engaged in the slot the weight element 90 may only be separated from the seat element 76 by displacing the weight element 90 until the head 95 is opposite the opening 87; in order to add a weight element to the seat element 76, the opposite procedure is followed. In this manner one or more such weight elements 90 may be disposed in an attached manner to the seat clement 76 (see for example FIGS. 1 and 25). The weight element 90 can take on any desired or necessary weight. However, keeping in mind that the support is to be broken down and rebuilt by one or more workers, the weight advantageously should be such as a reasonable worker is felt able to handle (e.g. 50 pounds).

The weight element 90 also has a loop element 98. The loop element 98 can serve as a handle to facilitate transport of the weight element 90. However, the loop element 98 is configured and disposed such that it can also facilitate the locking of the one or more weight elements in place over the seat element 76 as a security measure, i.e. to prevent the undesired removal of the weights during use of the support to support an object such as for example a chute. Turning back to FIGS. 12 to 14, the end elements 77 and 78 are provided with opposed openings 100 and 101 which are sized to each receive on end of an elongated locking rod 103. The end of the locking rod 103 passing through the opening 101 is straight while the end of the rod adjacent the opening 100 has a curled in part 104 which defines a closed loop opening. A plate element 105 extends from the element 77 and is provided with an opening 106. Once the desired number of weight elements are in place over the seat element 76 they can be locked in place by passing the straight end of the locking rod through the opening 100, under the loop elements 98 and then through the opening 101 until the closed loop opening of the curled in part 104 is aligned with the opening 106. At this point the shackle of a pad lock may be passed through both openings and locked in place. The rod 103 cannot be removed since the curled in part 104 will block such removal until the lock shackle is removed therefrom.

Referring to FIG. 3, the necessary number of weight elements 90 may be attached to the seat element 76 so as to provide a weight force 90*a* which will for example counter balance the weight force of the overhanging booms and as well as the weight force 90*b* of any chute attached thereto such that the center of gravity 90*c* of the support alone as well as of the support and chute is disposed over the roof surface (preferably, as far from the roof edge as possible).

Turning to FIG. 18, this figure illustrates a mast/boom/balance combination wherein the mast 1 is in a non-working mast position. As may be seen the mast 1 is only pivotally attached to the forward end portion 43 of the forward element 4 of the counter balance member 3 by means of the bolt/nut combination 28. In this configuration the mast 1 is able to pivot between the upstanding erect working mast position and the non-working mast position shown in the directions of the arrows 110 and 110*a* as the case may be. The end portion 15 of boom 2 is able to slide in the directions of the arrows 111 and 111*a,* as the cue may be, through the opening 35 of the gripping dement 34, i.e. either for removal from engagement with the mast 1 or such that the openings 16 and 30 are aligned for engagement with the bolt/nut combination 31 so as to releasable attach the boom 2 to the mast 1 (see FIGS. 1 and 18). Similarly the extension dement 70 of the tail element 4 of the counter balance member 3 is able to slide in the directions of the arrows 112 and 112*a,* as the case may be, through the opening 63, i.e. either for removal from engagement with the forward element 4 or such that the openings 65 and 73 are aligned for engagement with the bolt/nut combination 66 so as to releasable attach the tail element 5 to the forward element 4.

As mentioned above, the object to be supported by the support may for example be a chute. In this case the support may comprise a boom chute hanging means. The chute hanging means may for example take the form shown in FIGS. 26 and 27. The boom chute hanging means shown in FIG. 26 comprises a boom engaging element 120 for slidingly engaging a boom 2. The boom engaging element 120 has an opening 121 which has a width 122 which is slightly larger than the horizontal width of the boom 2 when the boom 2 is attached to the mast 1. The opening 121 also has a width 123 which is slightly larger than the largest vertical width of the boom 2 when the boom 2 is attached to the mast 1. The boom engaging element 120 may thus be slide onto or off of a boom 2 (which is unattached to the mast) from the end portion 15 of the boom 2 (see FIG. 5). Once the boom is attached to the mast 1 the boom engaging element 120 is able to slide along the boom 2 between the mast 1 and the tubular element 10 which of course prevent the removal of the boom engaging element 120 from the boom 2. The boom engaging element 120 includes a plate element having an opening 124 communicating with a chain link attachment slot 125.

Figure 27:
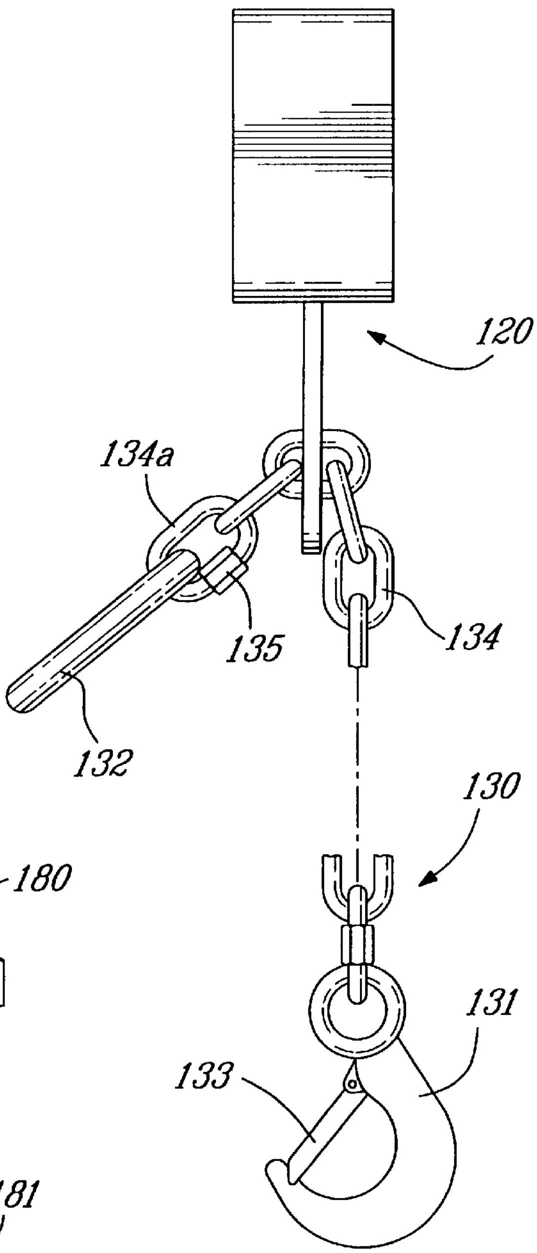
FIG. 27 is a side view of the boom engaging element of FIG. 26 with a chain attachment element for releasably engaging a chute in an upwardly extending working position.

FIG. 27 is a side view of the boom engaging element 120 but with a chain attachment element 130 for releasably engaging a chute in an upwardly extending working position. The attachment to the chute is achieved either by means of the locking hook 131 or a hook ring 132 depending on whether or not the chute has an attachment ring member fixed thereto or else a rope with a locking hook attached thereto. The locking hook 131 includes blocking element 133 which is spring biased member biased in a position so as to close off the hook opening (i.e. for security purposes); the bias is such that the blocking element 133 can be pushed aside to allow the hook 131 to be attached to or detached from, for example, a hook ring or loop. The chain attachment element 130 comprises a plurality of chain links 134. The end chain link 134*a* is split along one side to provide a link opening wide enough to engage or disengage the hook ring 132 from the link 134. The link opening as shown is closed off by a displaceable closure element 135 which has interior screw threads which engage exterior screw threads on one of the link arms on either side of the link opening; thus the closure element 135 can be rotated so as to move towards or away from the other link arm which is able to be engaged in an opening in the closure element 135 when the closure element is disposed so as to close off the link opening as shown in FIG. 27. The links 134 (including link 134*a*) are smaller than the opening 124 of the boom engagement element such that the chain may be moved to a fro through the opening. However, since the locking hook 131 and the hook ring 132 are larger than the opening 124 the chain attachment element 130 cannot be removed unless the hook ring 132 is removed from link 134*a* by opening the link opening therof by appropriate rotation of the closure dement 135; following a reverse procedure a chain attachment 130 may be attached to the boom engagement element 120. The links 134 are sized such that either one of them is able to fit sideways into the chain link attachment slot 125; but the adjacent transverse links are unable to pass through the slot so as to effectively jam the links in place for supporting an object.

Turning back to then stabilizing component, the cross beams 6, 7 and 8 may be releasable fixed in place in appropriate tubular elements by any suitable desired or necessary attachment means. For example, the tubular elements 10, 38 and 55 may be provided with set screw means whereby once a beam is in place in the tubular element a set screw is tightened in its opening in the wall of the tubular element until it clamps up against the beam so as to wedge the beam in place. Alternatively, beams may be so sized that an end portion at each end thereof may extend outwardly of a tubular element. Each such exposable end portion may be provided with an opening for receiving a blocking screw, a locking clip or the like which will impede the removal of the beam from the tubular elements. If desired the beam may also be provided with similar openings on the inner side of the beams adjacent the tubular elements such that the tubular elements are bracketed between the blocking screw, locking clip or the like. This latter type of attachment may be used in the case when the first cross beam 6 is to be free to rotate or pivot about its longitudinal axis when the first cross beam is engaged in the opposed tubular elements 32.

Figure 24:
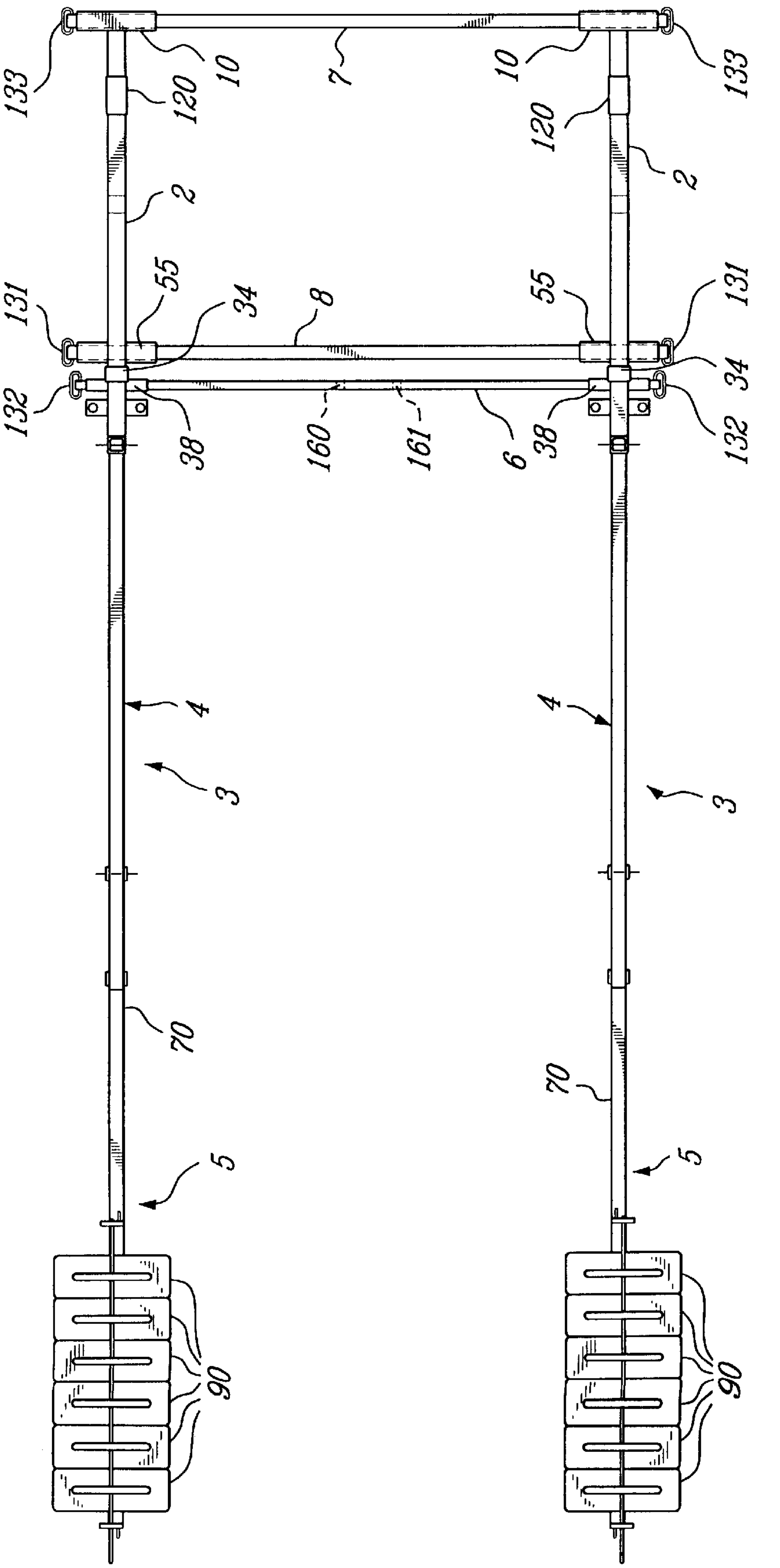
FIG. 24 is a top view of the support shown in FIG. 1 showing an additional optional front base cross beam connecting the front parts of the front forward end portions of the counter balance members.

Referring to FIGS. 18, 19, and 24, a support may be assembled adjacent to the edge of a roof as follows:

at some distance away from the edge of the roof the ends of the base cross beam 8 may be engaged in respective openings 56 of the tubular elements 55 of two forward elements 4 such that the forward elements 4 are spaced apart;

locking clips 131 may be engaged in openings in the cross beam 8, which are disposed near the outer ends of the base cross beam 8, to secure the base cross beam to the forward elements 4;

the forward elements may be advanced until the tubular elements 55 are supported on the roof surface adjacent to the roof edge;

respective tail elements 5 may be attached to each of the forward elements 4 by passing the end part 71 of extension element 70 into the opening 63 of the forward element 4 until the openings 65 and 73 are aligned at which point the two elements are attached together by the bolt/nut combination 66 (the bolt part passing through the aligned openings);

the necessary number of weight elements 90 may be attached to the seat element 76 which will counter balance the weight of the overhanging booms and as well as that of the chute such that the center of gravity of the support alone as well as of the support and chute is disposed over the roof surface (preferably, as far from the roof edge as possible);

the ends of the first cross beam 6 may be rotatably engaged in respective openings 39 of the tubular elements 38 such that the masts 1 are spaced apart;

locking clips 132 may be engaged in openings disposed near the outer ends of the first cross beam 6 to secure the first cross beam 6 to the masts 1;

the masts connected by the first cross beam 6 may each be pivotally connected to a pivot point by bolt/nut combination 28 as shown in FIG. 18;

a boom engagement element 120 including a chain attachment element 130 may be slipped over the end portion 15 of each of two booms;

the ends of the second cross beam 7 may be engaged in respective openings 11 of the tubular elements 10 of the two booms 2 such that the booms 2 are spaced apart;

locking clips 133 may be engaged in openings disposed near the outer ends of the second cross beam 7 to secure the second cross beam 7 to the booms 2;

the end portion 15 of each boom may be slipped through the opening 36 of a gripping element 35 of a respective mast 1 in the direction of the arrow 111*a* (see FIG. 18) until the openings 16 and 30 are aligned at which point the two elements are attached together by the bolt/nut combination 31 (the bolt part passing through the aligned openings);

the masts 1 are then pivoted in the direction of the arrow 110 (see FIG. 18) until the ends 18*a* of the elongated elements 18 thereof are engaged in openings 47 and the openings 25 and 50 are aligned at which point the two elements are lockingly attached together, at the locking point defined by these openings, by the bolt/nut combination 27 (the bolt part passing through the aligned openings) such that the masts 1 are in a more or less vertical working mast position (see for example FIG. 19) and the booms extend forwardly thereof (see FIG. 24), i.e. the support is in a working mast position.

The support may be broken down by following the above steps in reverse order.

Although the above mentioned support has been described in relation to a bolt/nut combination 27 for releasably locking the mast and counter balance member together any other releasable locking mechanism may be used for this purpose. For example elongated member 19 may be provided with an attachment plate extending rearwardly just below the level of the beam 6; the upper elongated element 40 may be provided with an upwardly extending attachment plate near plat 62.

A suitable rod member (i.e. of appropriate strength) may be hingedly connected at one end to one such plates and be able to be attached at the opposite end by a bolt/nut combination to the other plate. When the rod is so attached to the elements 40 and 19 it will resist rearward pivoting of the mast 1. The length of the rod may of course be so chosen that the mast for all intents and purposes is rigidly held in the working mast position U shown for example in FIG. 1).

Figure 20:
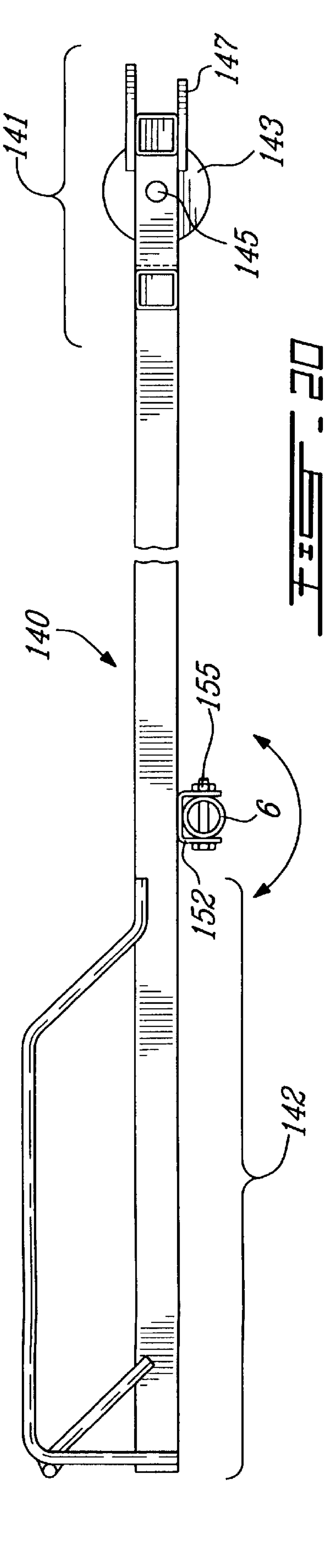
FIG. 20 is a side view of an example embodiment of an arm member of a lifting pole in accordance with the present invention but with the winch not shown and the arm being shown as being fixed to the first cross beam of the support as shown in FIG. 2.
Figure 21:
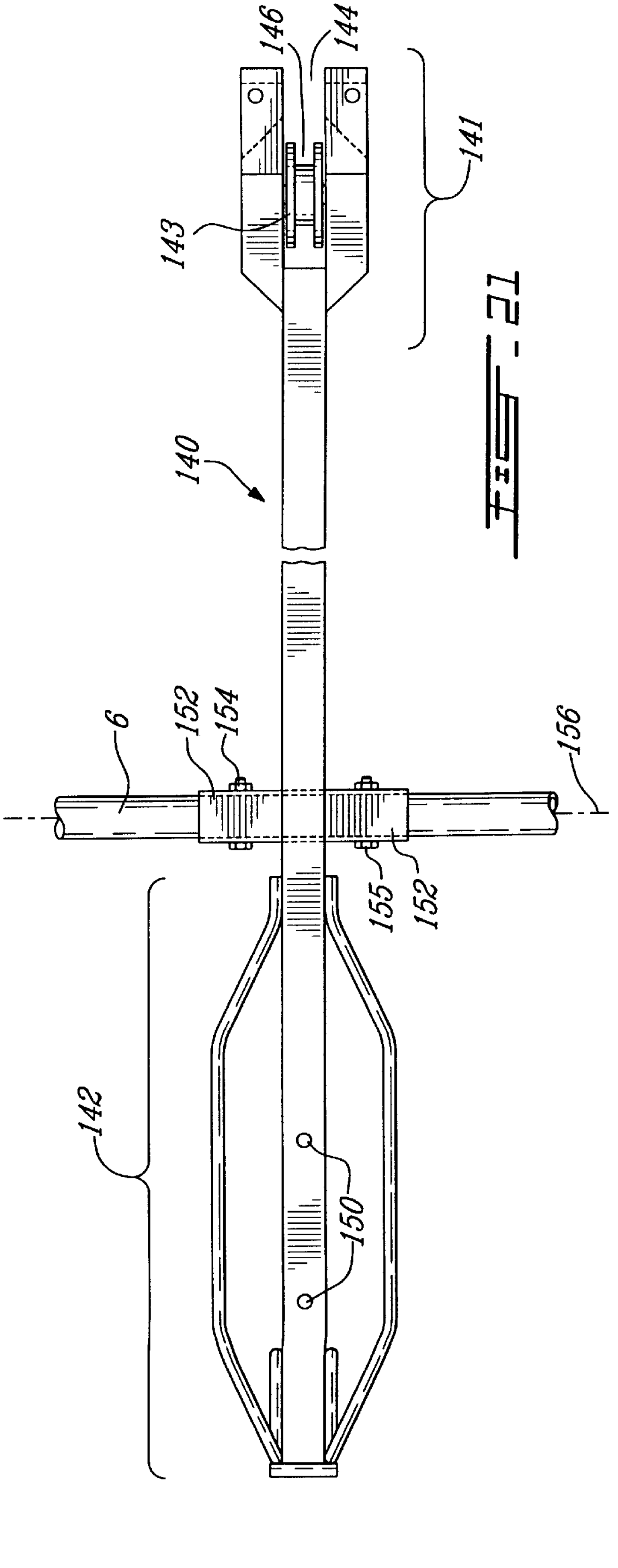
FIG. 21 is a top view of the arm member shown as shown in FIG. 20.

FIGS. 20 and 21 illustrate an sample embodiment of an arm member 140 of a lifting pole of the present invention; the arm member is shown as being attached to the first cross beam 6 which is only partly illustrated. The arm member 140 has a front portion 141 and a rear portion 142. The front portion 141 has a guide element for engaging a rope of the lifting pole; the guide element illustrated is in the form of a sheave 143 which is pivotally mounted in a slot 144 by pivot pin 145. The sheave 143 has circular groove 146 for engaging a rope of the lifting pole. Since the sheave is pivotally mounted, it will be able to rotate as the rope engaged in the groove is either played out or reeled in. The front portion 141 also has a pair of opposed resting plates 147 on either side of the slot 144 (only one plate 147 is shown in FIG. 20, the other being hidden therebehind). These plates 147 are for releasably supporting the arm member 140 against the second cross beam 7, i.e. the arm member may engage (i.e. rest against) the second cross beam 7 using the plates 147.

Figure 22:
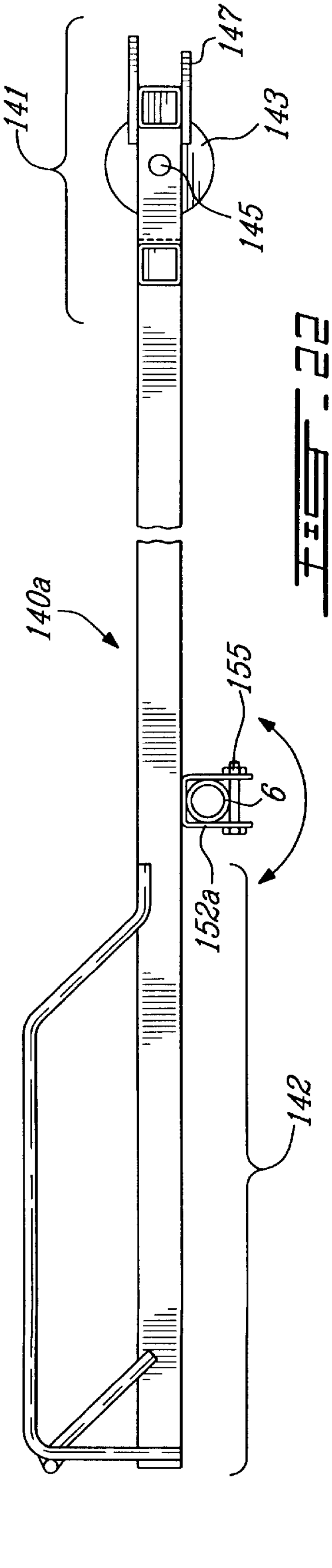
FIG. 22 is a side view of an example embodiment of an arm member of a lifting pole in accordance with the present invention but with the winch not shown and the arm being shown as being pivotally attached to the first cross beam of the support as shown in FIG. 2.
Figure 23:
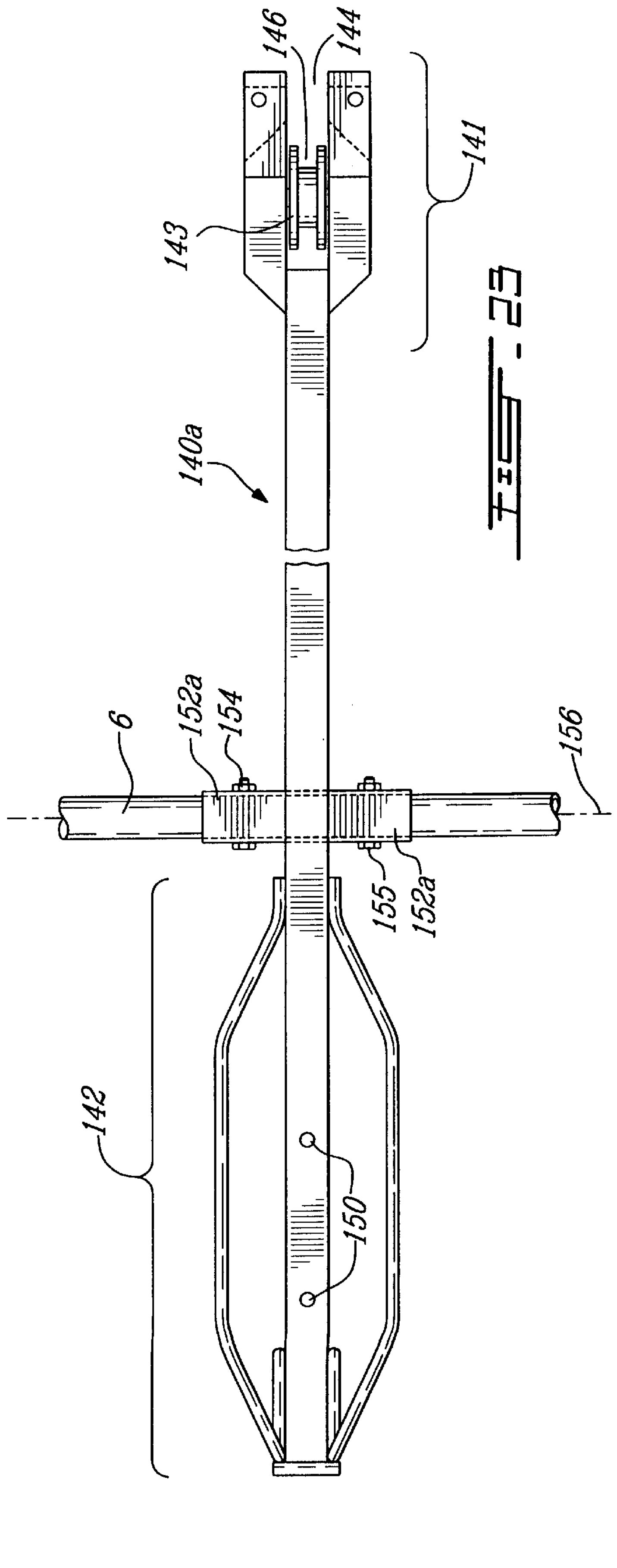
FIG. 23 is a top view of the arm member shown as shown in FIG. 22.

The rear portion 142 of the arm member 140 is intended to be attached to a winch element and is provided with openings 150 for the bolt/nut attachment of a winch thereto; alteratively the winch may be welded to the arm member 140 when the winch and arm member are of metal. The arm member 140 is also provided with a cross beam attachment element 152 having a U-shaped channel for receiving the first cross beam 6 therein. The cross beam 6 has two spaced apart openings which can be aligned with two similar spaced apart openings in the attachment 152 for receiving the bolt/nut combinations 154 and 155 which are used to fix the arm member to the first cross beam 6. With this arm member attachment mechanism, the first cross beam 6 itself is rotatably attached at its opposite ends to the mast 1 in order to be able to pivot the arm member 140 about the longitudinal axis 156 of the first cross beam. It may however, be desired to fix the first cross beam 6 to the masts 1 such that it is not able to rotate. In this case the arm member may alternatively be pivotally attached to the first cross beam 6 by using the modified arm member 140*a* shown in FIGS. 22 and 23. The arm member 140*a* is essentially of the same construction as the arm member 140; accordingly the same reference numerals are used to designate the common elements. The only difference between the arm member 140 and 140*a* is that the cross beam attachment element 152*a* has a U-shaped channel for receiving the first cross beam 6 therein which is deeper than that of the element 152. Accordingly, the openings in the element 152*a* for receiving the bolt/nut combinations can be disposed such that the bolt parts are below and spaced from the first cross beam 6. The U-shaped channel is also configured and sized such that when the arm member is connected to the first cross beam with the bolt/nut combinations in place, the arm member itself can be rotated about the longitudinal axis 156 of the first cross beam 6.

The support illustrated in FIGS. 2 to 19 and 24 may be combined with the arm member shown in FIG. 20 to form along with a suitable winch element, a hoist system in accordance with the present invention.

Figure 25:
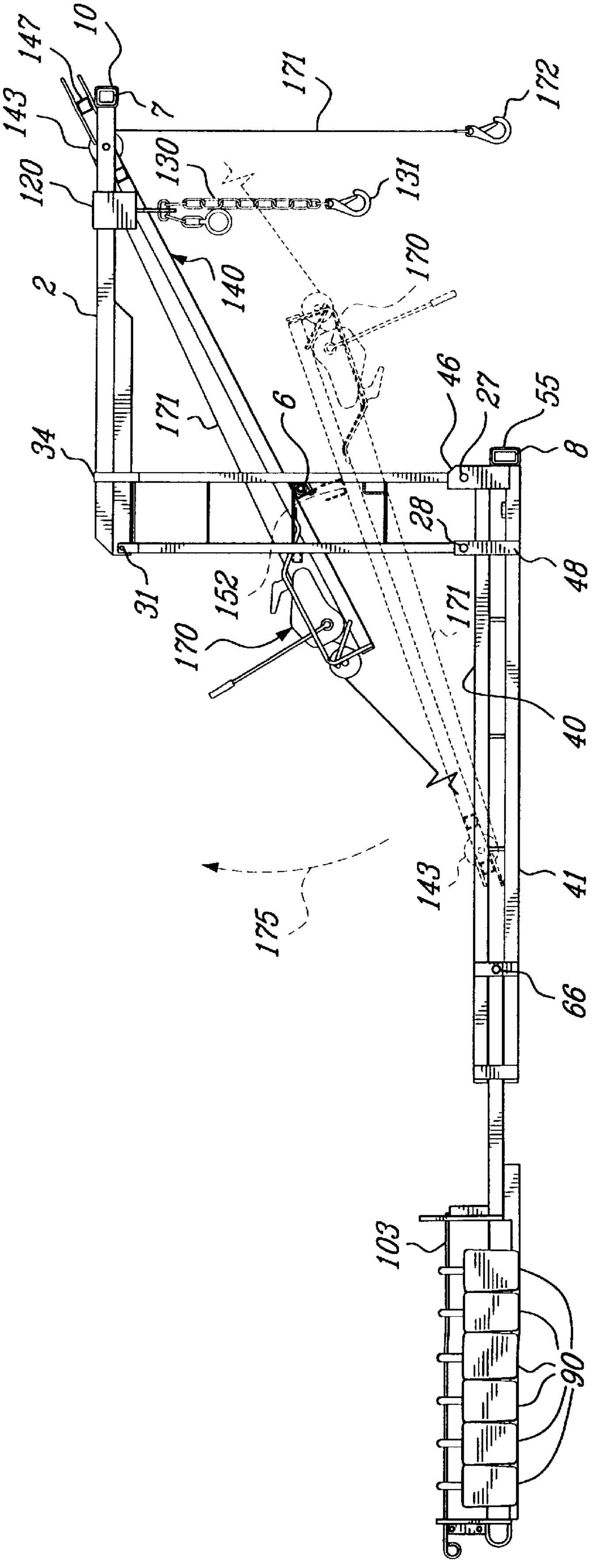
FIG. 25 is a side view of an embodiment of a hoist system in accordance with the present invention comprising the support as shown in FIG. 24 and the arm member of FIG. 20 attached to the first cross beam, a winch being attached to the arm member.

Turning to FIGS. 24 and 25, as mentioned above, the first cross beam 6 is rotatably attached to the masts 1. In FIG. 24 the openings designated by the reference numerals 160 and 161 are for the bolt/nut combinations 154 and 155 (the latter being shown in FIG. 21). The lifting pole comprises an arm member 140 which is attached to suitable winch element 170; the winch is attached to a rope 171 which is engaged in the sheave 143 and is provided with an attachment hook 172 which is of the same construction as hook 131 described above. The lifting pole is attached to the first cross am 6 by first being disposed upside down under the first cross beam 6 as seen in dotted outline in FIG. 25. The lifting pole in this position is disposed such that it can be lifted up so that the first cross beam can be engaged in the channel of the cross beam attachment element 152. The openings in this channel are then aligned with the openings 160 and 161 at which point the bolt part of each of the bolt/nut combinations 154 and 155 are passed through the aligned openings and the nuts thereof attached to the exposed threaded ends thereof so as to fix the lifting pole to the first cross beam (see for example FIG. 20). Once the lifting pole is fixed to the first cross beam 6 it may then be pivoted or rotated about the longitudinal axis of the first cross beam in the direction of the arrow 175 until the plates 147 at the front end of the arm member 140 rests against the second cross beam 7. The arm member 140 is sized such that the sheave 143 is spaced apart from the second cross beam 7 and is able to freely rotate in the slot 146 of the arm member 140, i.e. so that the rope 171, engaged in the groove 146 of the shave 143, is able to freely travel back and forth through the slot 146 of the arm member 140 for lifting and lowering a load (i.e. an object).

As may be seen from FIG. 25, the lifting pole is inclined upwards from the first cross beam 6 such that the winch element 170 is lower than the sheave 143. The lifting pole may, however, be disposed differently, e.g. the lifting pole may be disposed such as to be more or less horizontal.

Figure 28:
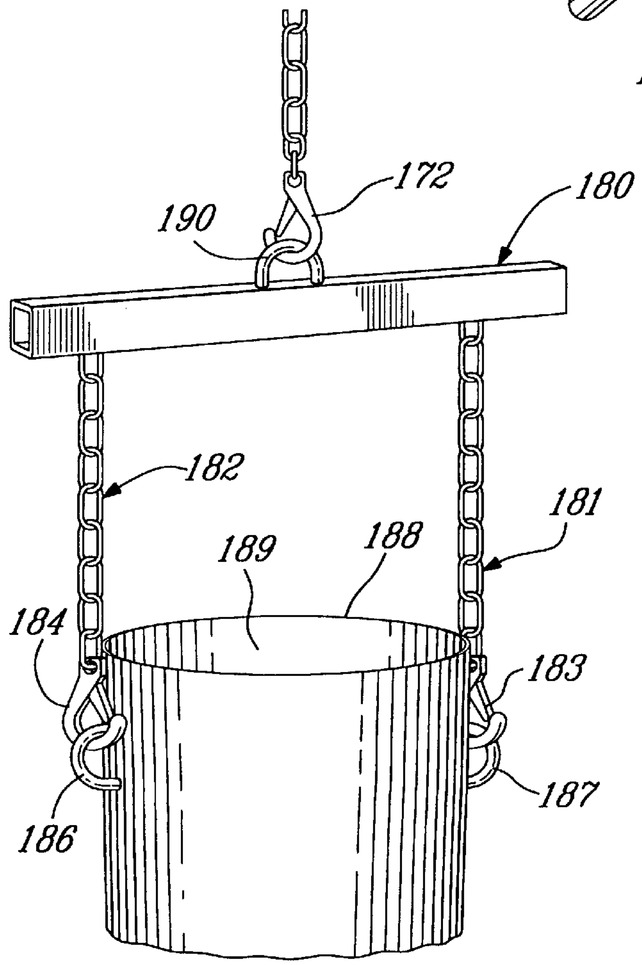
FIG. 28 illustrates a load spreader bar member for engaging a chute for the raising and lowering thereof.

FIG. 28 illustrates a load spreader bar member 180 for engaging a chute for the raising and lowering thereof using the hoist system shown in FIG. 25. The bar member has two rope elements 181 and 182. The rope elements 181 and 182 are each provided with hooks 183 and 184 respectively; hooks 183 and 184 have the same construction as hook 131 described above. These hooks 183 and 184 may be used to releasably engage side attachment loops 186 and 187 which are attached to opposite sides of a chute 188; the chute 188 nay if desired comprise additional attachment loops in which case the spreader bar member 180 may likewise comprise additional rope elements for engagement therewith. The chute 188 as seen has an upper opening 189; the chute may for example comprise a plurality of chute sections as seen generally in FIG. 29 (see also FIG. 15 of U.S. Pat. No. 5,472,768 for an example of a plurality of interconnected chute sections include an example mechanism for interconnecting the chute sections). The bar member 180 also has an attachment 190 for being attached to the hook 172 of the rope of the lifting pole. Once the chute 180 is raised to the height of the support by the lifting pole, the hooks 131 of the boom chute hanging means are attached to the loops 186 and 187 and then the hooks 183 and 184 are removed such that the chute is then held in place by the support. Once the chute is so supported the bar member may be detached from the hook 172 and the lifting pole may be detached from the support by following the reverse of the steps described above for its attachment to the first cross beam 6 (e.g. the arm member 140 is first swung or pivoted rearwardly in the direction opposite to that of arrow 175 (see FIG. 25) and the lifting pole is then detached from the cross beam 6). Once the lifting pole is removed then if desired the cross beam 6 may also be detached so as to provide freer access to the opening 189 of chute 188.

When it is time to lower the chute the lifting pole is put back in place, the load spreader is attached to the lifting pole rope, the load spreader is attached to the chute, the chute is detached from the chute hanging means, and the chute is lowered. Thereafter the hoist stem may be broken down for transport and/or storage.

FIGS. 29 to 44 illustrate other example embodiments of a support and a hoist system in accordance with the present invention.

Figure 29:
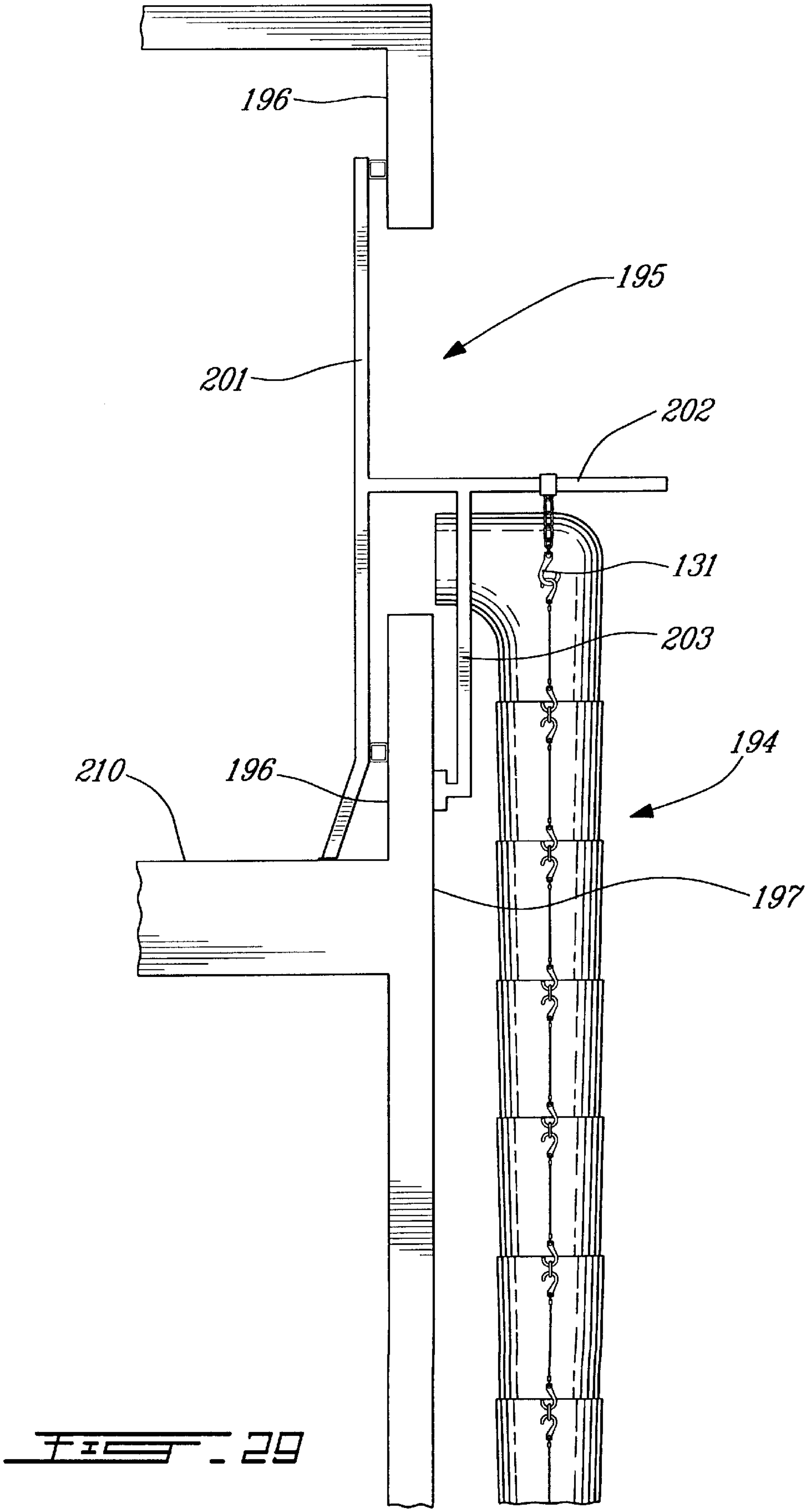
FIG. 29 is a schematic illustration of an example embodiment of a wall engaging support positioned in a window of a room so as to support a chute comprising a plurality of interconnected chute sections.
Figure 30:
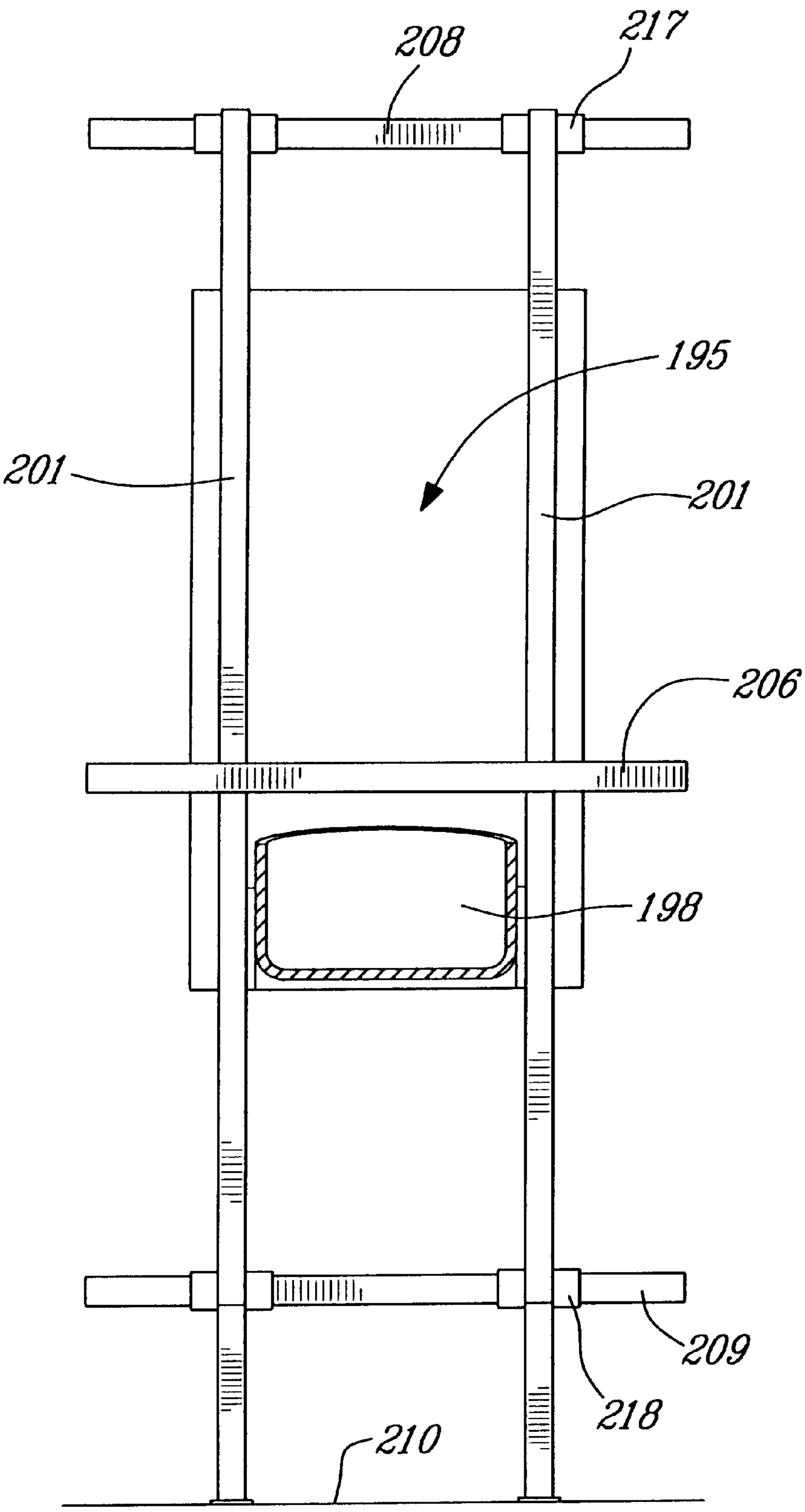
FIG. 30 is a schematic view of the support illustrated in FIG. 29 as seen in the room from behind the support and facing the window.

FIGS. 29, 30 and 31 illustrate an example embodiment of a wall engaging support in accordance with the present invention; elements of this support are also releasably attached (e.g. by bolt/nut combinations, bolts, set crews, and the like) such that the support can be broken down for transport or storage, i.e. the wall engaging support may be reduced to a support kit from which the support may be rebuilt.

In FIGS. 29, 30 and 31 the wall engaging support is shown as being installed in a window for supporting a chute 194 in an upwardly extending working position along the side wall of a building for funnelling debris from the floor on which the window is located or if the chute has lower intermediate openings from other lower floors of the building to a debris container. The window 195 is disposed in a wall having an inner surface 196 and an outer surface 197. As seen in FIG. 30 the chute has an upper opening 198.

The wall engaging support has two mast elements 201, two booms 202 and two foot elements 203. Referring to FIG. 31, the booms 202 each have a forward element 204 and an inner tail element 205 which are releasably attached together. The mast elements 201 are also each releasably attached to a respective tail element 205 so as to form a mast/boom/foot combination; i.e. the support comprises a pair of mast/boom/foot combinations of the same construction. The mast/boom/foot combinations are spaced apart and are interconnected by cross beams. Thus the wall engaging support also has a first cross beam 206, a second cross beam 207 as well as upper and lower cross beam 208 and 209. The first cross beam 206 is releasably connected to the tail elements 205 (i.e. the beams 206 are indirectly connected to masts); the second cross beam 207 is releasably connected to the forward elements 204 of the booms 202; and upper and lower cross beams 208 and 209 are releasably connected to respective end portions of the counter masts 201.

The mast elements 201 are shown in FIGS. 29, 30 and 31 as rising vertically more or less perpendicular to the floor surface 210. The mast elements 201 could however if so desired extend upwardly at a non perpendicular angle to the floor surface. The mast elements 201 are also shown as being more or less parallel to each other; if so desired the mast elements 201 may be non-parallel to each other.

Reference will now be made to FIGS. 33 to 39 which describe the elements a mast/boom/foot combination; the following comments of course apply to both of the mast/boom/foot combinations of the wall engaging support.

FIGS. 33, 34, 35 and 36 illustrate a mast element 201. As seen from FIG. 33 the mast element 201 comprises a rectangular elongated member. The elongated member is provided with a plurality of openings which pass from one side thereof to the other (a number of theses openings are designated with the reference numeral 214); these openings are provided for the attachment of the boom 202 to the mast 201 at a plurality of possible heights. The mast element 201 also has an upper end portion 215 and a lower end portion 216. As seen from FIGS. 35 and 36 which are enlarged views of the upper and lower end portions, each end portion has a transversely extending rectangular tubular element 217 and 218 respectfully.

The tubular elements 217 and 218 we sized such that when the mast element 201 is laid up against the inner surface 196 with the tubular elements 217 and 218 abutting the inner surface 196 (see FIG. 29). The tubular elements 217 and 218 may act as stabilizing members so as to, for example, inhibit rotation of the mast element 201 about its longitudinal axis. The tubular element 217 is hollow and has a rectangular opening 219; similarly, the tubular element 218 is hollow and has a rectangular opening 220.

The tubular elements 217 and 218 may alone act to stabilize the mast 201 in an upright position; e.g. even if the first cross beam 6 is removed to provide easier access to the opening 198 in a chute, the tubular elements 217 and 218 may stabilize the mast element 201 (if necessary or desired they may of course be lengthened). However, the opening 219 may engage an end of upper cross beam 208 in order to enhance the stabilizing effect of the tubular element 217. The end of cross beam 208 (not shown in FIGS. 33 to 36) intended to engage the opening 217 has a complementary rectangular cross section and is sized so as to be able to slidingly and snugly engage the interior walls of the opening 217. Alternatively, or additionally the opening 220 may engage an end of lower cross beam 209 in order to enhance the stabilizing effect of the tubular element 218. The end of cross beam 209 (not shown in FIGS. 33 to 36) intended to engage the opening 218 has a complementary rectangular cross section and is sized so as to be able to slidingly and snugly engage the interior walls of the opening 218.

If desired, and as an alternative, the mast element 201 need not include the tubular elements 217 and 218 at all. In this case the first cross beam 206 may provide the desired or necessary stability for the wall engaging support. If the first cross beam 206 is to be removed so as to allow access to chute opening 198) the mast may be provided with a tubular element having the same configuration as element 217 but which is attached to the mast element 201 at a position adjacent to the window sill for engagement with a lower cross beam having the same configuration as the above mentioned upper cross beam 208, i.e. such a lower cross beam may act as an alternate or additional first cross beam attached to the masts 201.

Figure 41:
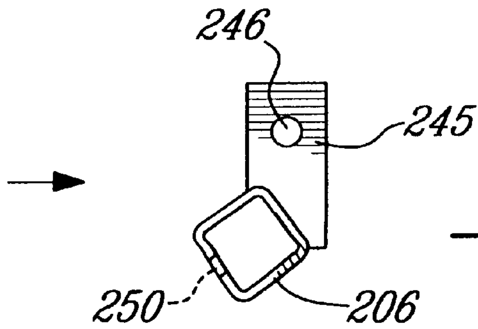
FIG. 41 is a side view of the first cross beam shown in FIG. 40.

The tubular elements such as elements 217 and 218 may for example be welded to the elongated member of the mast element 201 if the mast element is of metal. The tubular elements may be provided with openings for attachment of the ends of cross beams thereto, i.e. for receiving a bolt/nut combination, for receiving a set screw or the like for maintaining the beams in place. Alternatively, the beams may be held in place by providing the ends of the beams with end openings for receiving removable locking clips such as mentioned above with respect to beams 6, 7 and 8. Referring to FIG. 41 bolt/nut combinations 217*a* and 218*a* are shown as attaching beams 208 and 209 to tubular elements 217 and 218.

Figure 37:
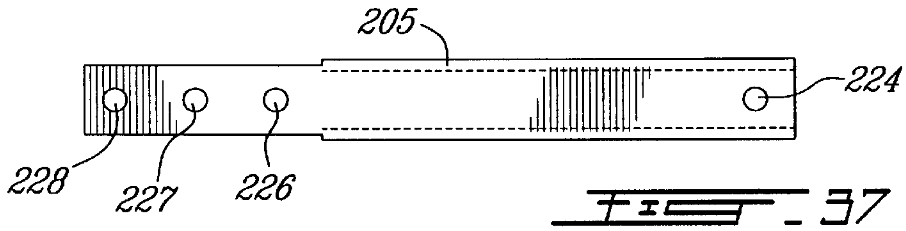
FIG. 37 is a side view of a tail element of a boom as shown in FIG. 31.
Figure 38:
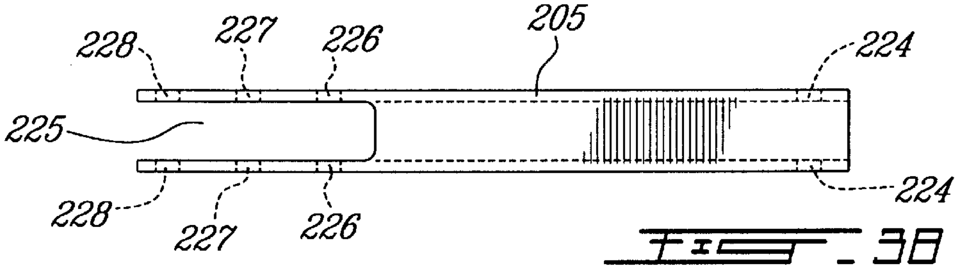
FIG. 38 is a top view of the tail element shown in FIG. 37.

FIGS. 37 and 38 illustrate a tail element 205. The tail element 205 is hollow and has an interior channel of rectangular cross section which is open at both ends; the interior channel is configured and sized so as to slidingly and snugly engage an end of forward element 204 in telescopic fashion. The tail element has pair of opposed openings 224 only one of which can be sen in FIG. 37, the other being hidden from view on the other side of the tail element 205. The pair of openings 224 are used to each the forward element 204 to the tail element 205. The tail element 205 also has a slot 225 which is sized and configured to slidingly and snugly engage a mast 201. The side walls defining the slot 225 are provided with opposed pairs of openings 226, 227 and 228. The openings 227 may for example be used to attach the tail element 205 to the mast element 201 at a pair of openings 214 (see FIG. 23) providing the desired height for the boom 202. The pair of openings 228 may be used to attach the first cross beam 206 to the tail element and thus to the mast 201 (albeit indirectly). The releasable attachment of the elements together using the openings may be accomplished by use of suitable bolt/nut combinations. Referring to FIGS. 31 and 44 a bolt/nut combination 227*a* may be used to attach the tail element 205 to the mast 201.

Figure 39:
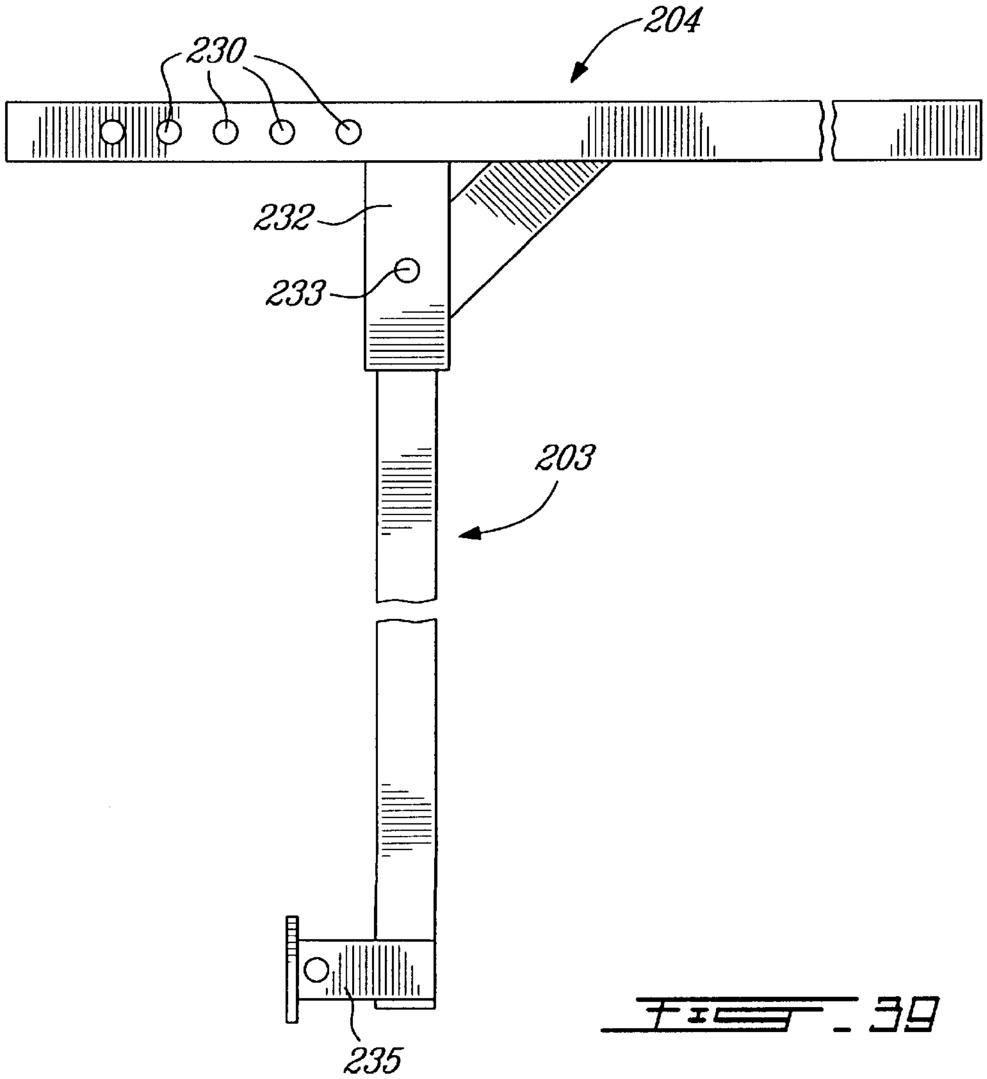
FIG. 39 is a side view of a forward element of a boom of a support as shown in FIG. 31.

FIG. 39 illustrates a forward element 204 as well as a foot element 203. The forward element 204 is provided with a plurality of pairs of opposed openings a number of which are designated by the reference numeral 230; the opposed openings 230 are hidden from view on the other side of the forward element 204. The forward element 204 is configured so as to be able to engage in telescopic fashion the interior channel of the tail element 205; it is to be understood of course that if desired the tail element 205 and forward element 204 may be so configured that the tail element 205 may be telescopically engaged in a channel of the forward element 204. The tail element 205 and the forward element 204 may be releasably attached to each other by a bolt/nut combination 236 the bolt part of which is engaged in aligned openings 224 and 230 (see FIGS. 31 and 44); depending on the choice of openings 230 the length of the boom 202 may be shortened or lengthened as the case may be in order to vary the distance between the foot element 203 (attached to the forward element 205) and a respective mast 201. The forward element 204 has a lower connector projection 232 which has an opening for slidingly and snugly receiving an end part of the foot element 203. The projection 232 is provided with a set screw 233 which may be used to releasably clamp the foot element 203 is place. The foot element 203 also has a toe end part 235 which is to engage the outer surface 197 of the wall below the boom 202.

Referring to FIG. 31 the forward element 204 is also provided with upper openings, a number of which are designated with the reference numeral 240. These openings are used in conjunction with corresponding opening means in the second cross beam 207 to releasably attach the cross beam 207 to the forward element 204. Thus the openings 240 may have internal screw threads for engaging the external screw threads of a bolt shaft of a bolt 241 extending through the opening means of the second cross beam 207, the head of the bolt 241 clamping the beam 207 to the forward element when the beam 207 is attached to the forward element. As may be seen there are a number of such openings 240; this allows the second cross beam 207 to be disposed at a number of different positions.

The mast 201 may have a tubular element, such as for example an element similar to tubular element 217, for attaching a first cross beam 206 thereto. Attentively, as seen in FIGS. 31, 32 and 44 the first cross beam may be releasably attached to the tail element 205, the tail element 205 in turn being releasably attached to the mast 201.

Figure 40:
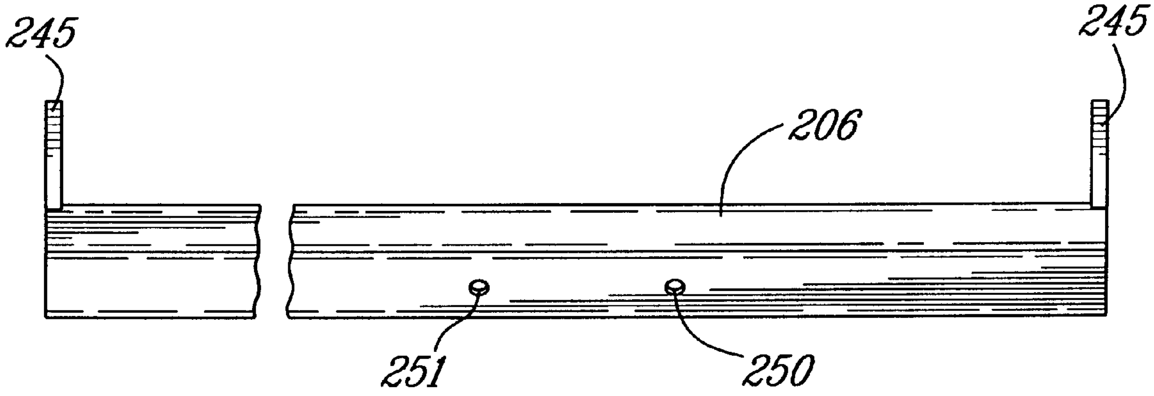
FIG. 40 is front view of the first cross beam of the wall support as shown in FIG. 31.

FIGS. 40 and 41 illustrate an example first cross beam 206 for attachment to the tail element 205. The first cross beam 206 has a rectangular elongated body provided at each end thereof with attachment plates 245. Each attachment plate 245 is provided with an opening 246. The openings 246 may be aligned for example with openings 228 of the tail element (see FIG. 37) such that a bolt/nut combination 247 may releasably attach the first cross beam 206 to the tail element 205. FIG. 32 illustrates in schematic fashion a cross beam 206 in the process of being placed for connection to tail element 205; in FIG. 32 the tail element 205 is shown as being configured to telescopically engage the interior opening of the forward element 204 rather than the other way around as is shown in FIGS. 31 and 44.

The first cross beam 206 is also provided with two pairs of opposed openings for attaching the lifting pole thereto, only forward openings 250 and 251 can be seen in FIG. 40 since their respective opposed openings are hidden from view behind the elongated body of beam 206.

FIG. 44 shows in side view, the wall engaging support in a working position. Each of the toe elements 235 engages the outer wall surface 197 more or less directly below respective booms 202. It is to be understood of course that as long as the foot elements are able to participate with the mast elements and booms for maintaining the support in such a working position the foot elements may be disposed differently. The foot elements may, for example, engage the outer surface 197 at positions which are not directly below the booms but off to the sides thereof including points which may even be more or less level with the booms. In this latter case, however, care must be taken to ensure that the foot elements are not so disposed such that they are unable to co-operate with the mast elements and booms so as to maintain the support in a working position, i.e. they are to be in a position whereby the support is able to support an object such as a chute. Thus a foot element should not be disposed such that it engages the outer wall surface above a respective boom such that it cannot counteract the force of the weight of the object being support.

Each of the tubular elements 217 and 218 of the mast elements 201 engages the inner wall surface either below or above the window, for additional support, the lower end portions 216 of the mast elements 201 also rest on the floor surface 210. As with the foot elements the mast elements may engage the inner wall surface in a manner which is different from that shown but again as long as the mast elements are able to co-operate with the booms and foot elements so as to maintain the support in a working position. The tubular elements 217 and 218 may be disposed on the opposite side of the masts in which case the entire length of masts may be available for engaging the inner wall face, including above and below the window opening.

Figure 26:
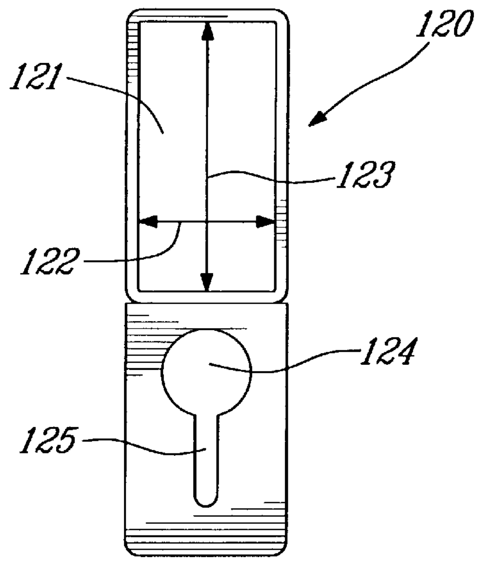
FIG. 26 is an end on view of a boom engaging element of a boom chute hanging means shown in FIG. 25 for slidingly engaging a boom.

The wall engaging support as shown in FIG. 44 is provided with boom chute hanging means which is basically the same as the hanging means illustrated in FIGS. 26 and 27, thus the same reference numerals are used to designate the same elements. The only difference is that the hanging means has a boom engagement element 120*a* which is provided with an open end interior of more or less square cross section for slidingly and snugly engaging the forward element 204; the boom engagement element 120*a* also has a set screw for clamping this element in place to the forward element 204.

FIG. 44 shows a wall engaging support in a working position with a lifting pole releasably attached thereto, i.e. the support is part of a hoist stem in accordance with the present invention.

FIGS. 42 and 43 illustrate an example embodiment of another arm member 140*a* of a lifting pole of the present invention which comprises an elongated element. The arm member 140*a* has a front portion 141*a* and a rear portion 142*a*.

The front portion 141*a* has a guide element for engaging a rope of the lifting pole; the guide element illustrated is in the form of a sheave 143*a* which is pivotally mounted by pivot pin 145*a* in a slot defined by a pair of opposed plate elements. The sheave 143*a* has circular groove 146*a* for engaging a rope of the lifting pole. Since the sheave is pivotally mounted, it will be able to rotate as the rope engaged in the groove is either played out or reeled in.

The front portion 141 a also has an elevation element 265 for the disposition of the arm member in an inclined configuration as shown; the elevation element 265 is releasably attached to the elongated element of the arm member 140*a*. The elevation element 256 has an upper channel element 266 and a lower channel element 267. Each of these channel elements has a U-shaped cross section. The channel elements are disposed transversely with respect to each other and are interconnected by side elements 270 and 271 so as to give the elevation element 265 a triangular aspect. The longitudinal opening of the upper channel 265 opens into the interior of the triangle. The upper channel 266 is configured to receive the elongated element of the arm member 140*a*. The upper channel 265 is also provided with a pair opposed openings for alignment with a pair of respective openings in the elongated element of the arm member such that the elongated element may be attached to the upper channel 265 by suitable bolt/nut combinations 272 and 273. The lower channel 267 is configured to engage and rest upon the second beam 207; see FIG. 44. The various elements of the elevation element 265 may be interconnected in any suitable manner (e.g. by welding if the elevation member is of metal)

The rear portion 142*a* of the arm member 140*a* is intended to be attached to a winch element and is provided with openings 150*a* for the bolt/nut attachment of a winch thereto; alternatively the winch may be welded to the arm member 140*a* when the winch and arm member are of metal.

The arm member 140*a* is also provided with a cross beam attachment element 152*a* having a U-shaped channel for receiving the first cross beam 206 therein. The attachment element has two spaced apart pairs of opposed openings which can be aligned with openings 250 and 251 of first cross beam 206 for receiving bolt/nut combinations which are used to fix the arm member to the first cross beam 206; one such bolt/nut combination 275 may be seen in FIG. 44.

In FIG. 44 the lifting pole comprises an arm member 140*a* which is attached to a suitable winch element 170*a*, the winch is attached to a rope 171*a* which is engaged in the sheave 143*a* and is provided with an attachment hook 172*a* which is of the same construction as hook 131 described above. The lifting pole may be attached to the first cross arm 206 by passing the front portion 141*a* under the first cross beam 206 upwardly between the first and second cross beams 206 and 207 until the channel element 267 is above the beam 207. At this point the beam 207 is engaged by the channel element 267 by resting this element onto the beam 207. The rear portion 142*a* is then displaced (e.g. swung upwards) to engage the channel of element 152*a* with the first cross beam 206 and align the openings 250 and 251 of the first cross beam 206 with the corresponding openings in the element 152*a* at which point the bolt part of each of the bolt/nut combinations 275 are passed through the aligned openings and the nuts thereof attached to the exposed threaded ends thereof so as to fix the lifting pole to the first cross beam. The rope 171*a*, engaged in the groove 146*a* of the sheave 143*a*, is then available to freely travel back and forth for lifting and lowering a load (i.e. an object).

A load spreader bar member 180 as illustrated in FIG. 28 may be exploited for engaging a chute for the raising and lowering thereof using the hoist system shown in FIG. 44. Once the chute opening 198 is at window level, the support of the chute may be transferred from the load spreader to the boom chute hanging means (e.g. to hooks 131). The lifting pole may then be detached from the support by reversing the steps described above for its attachment to the first cross beam 206 Once the lifting pole is removed then if desired the cross beam 206 may also be detached so as to provide freer access to the opening 198 of chute.

When it is time to lower the chute the lifting pole is put back in place, the load spreader is attached to the lifting pole rope, the load spreader is attached to the chute, the chute is detached from the chute hanging means, and the chute is lowered. Thereafter the hoist system may be broken down for transport and/or storage.

Although the supports have been described above with reference to pairs of masts, pairs of booms, pairs of foot elements, it is to be understood that a support in accordance with the present invention may be otherwise configured, e.g. comprise any other number of such components keeping in mind its function.

As a further alternative a hoist system in accordance with the present invention may comprise a support structure analogous to the structure such as shown in FIG. 1 and a lifting pole structure such as shown in FIGS. 42 and 43. The support structure could include a cross beam such as the cross beam 206 shown in FIG. 40. The upper rear ends of the booms could include rearwardly extending projections to which the attachment plates 245 of the beam 206 may be attached, i.e. the beam 206 would be attached at the upper ends of the masts. This hybrid alternative could thus take on the form as illustrated schematically in FIG. 45.

We claim:

1. A hoist system for raising and lowering an object, said system comprising a lifting pole and a support,
  said support comprising
    two spaced apart masts,
    two spaced apart booms, each boom being attached to and extending forwardly from a respective mast, and
    a stabilizing component for maintaining the support in a working disposition,
  said stabilizing component comprising
    a first cross beam attached to said masts,
    a second cross beam attached to said booms, and
    two counter balance members, each counter balance member being attached to and extending rearwardly from a respective mast,
  said lifting pole comprising
    an arm member, and
    a winch element attached to said arm member for playing out and reeling in a rope for the respective lowering and raising of said object,
    said arm member comprising a guide element for engaging said rope when the rope is played out or reeled in by the winch element, said guide element being spaced apart from said winch element
releasable attachment means attaching said lifting pole to said masts, said first cross beam, said second cross beam, and said arm member being configured and disposed such that the arm member is inclined upwardly from the first cross beam and the arm member engages said second cross beam such that said lifting pole is able to raise or lower said object.

2. A hoist system as defined in claim 1 wherein said guide element comprises a sheave for engaging said rope.

3. A hoist system as defined in claim 1 wherein said releasable attachment means comprises releasable connecting means attaching the lifting pole to said first cross beam and wherein the arm member, for the raising and lowering of said object, rests against said second cross beam.

4. A hoist system as defined in claim 1 wherein said system is for raising and lowering a chute respectively to and from an upwardly extending working chute position, and wherein said lifting pole comprises a load spreader bar member attached to said rope, said spreader bar member comprising at least two spaced apart rope attachment elements for releasable attachment of the spreader bar member to the chute.

5. A hoist system as defined in claim 1 wherein said first cross beam has a longitudinal axis, and said system comprises pivot attachment means pivotally attaching said first cross beam to said masts such that said first cross beam is rotatable about the longitudinal axis thereof, said lifting pole being attached to said first cross beam such that said arm member is rotatable about the longitudinal axis of said first cross beam towards and away from said second cross beam.

6. A hoist system as defined in claim 1 wherein said first cross beam has a longitudinal axis and is fixed to said masts, and said system comprises pivot attachment means pivotally attaching said lifting pole to said first cross beam such that said arm member is rotatable about the longitudinal axis of said first cross beam towards and away from said second cross beam.

7. A hoist system as defined in claim 1 wherein each said counter balance member comprises counterweight means.

8. A hoist system as defined in claim 1 wherein said system is for raising and lowering a chute respectively to and from an upwardly extending working chute position, and wherein said system comprises boom chute hanging means associated with said booms for releasably engaging the chute such that a raised chute is able to hang thereby from said booms in said working chute position.

9. A hoist system as defined in 1 wherein each mast is pivotally attached to a respective counter balance member such that the mast is able to pivot between a working mast position and a rearward non-working mast position and wherein said support comprises a locking component for releasably locking said mast in said working mast position.

10. A hoist system as defined in claim 3 wherein said guide element comprises a sheave for engaging said rope, wherein each said counterbalance member comprises a forward releasable lock point, a rearward pivot point, and counterweight means, wherein said first cross beam has a longitudinal axis, wherein each mast is attached to a respective counter balance member in a working mast position at the forward releasable lock point on the counter balance member and at the rearward pivot point on the counter balance member such that when the mast is only attached to said counter balance member at said pivot point, the mast is able to pivot about said pivot point between said working mast position and a rearward non-working mast position, and wherein said system comprises releasable pivot attachment means pivotally attaching said first cross beam to said masts such that said first cross beam is rotatable about the longitudinal axis thereof, said lifting pole component being attached to said first cross beam such that said arm member is rotatable about the longitudinal axis of said first cross beam towards and away from said second cross beam.

11. A hoist system as defined in claim 3 wherein said guide element comprises a sheave for engaging said rope, wherein each said counterbalance member comprises counterweight means, wherein said first cross beam has a longitudinal axis and is releasably fixed to said masts by a respective releasable attachment means, wherein each boom is attached to a respective mast by respective releasable attachment means, and wherein each mast is attached to a respective counter balance member in a working mast position at a forward releasable lock point on the counter balance member and at a rearward pivot point on the counter balance member such that when the mast is only attached to said counter balance member at said pivot point, the mast is able to pivot about said pivot point between said working mast position and a rearward non-working mast position, and wherein said system comprises pivot attachment means pivotally attaching said lifting pole component to said first cross beam such that said arm member is rotatable about the longitudinal axis of said first cross beam towards and away from said second cross beam.

12. A kit for the construction of a rebuildable hoist system for lifting and lowering an object, said kit comprising a support component, and a lifting pole component, said support component comprising two masts, two booms, respective releasable attachment means for releasably attaching a respective boom to a respective mast so as to extend forwardly therefrom, and a stabilizing component for maintaining the support in a working disposition, said stabilizing component comprising a first cross beam, means for releasably attaching said first cross beam to said masts a second cross beam, means for releasably attaching said second cross beam to said booms, said first cross beam being attachable to said masts and said second cross beam being attachable to said booms such that said masts and booms are spaced apart, two counter balance members, and respective releasable attachment means for releasably attaching a respective counter balance member to a respective mast, each counterbalance member being attachable to a respective mast so as to extend rearwardly therefrom said lifting pole component being releasably connectable to said masts by a respective releasable attachment means and comprising an arm member, a winch element for playing out and reeling in a rope for the respective lowering and raising of said object, and means for releasably attaching said winch element to said arm member, said arm member comprising a guide element for engaging said rope when the rope is played out or reeled in by the winch element, said guide element being spaced apart from said winch element when said winch element is attached to said arm member, said first cross beam, said second cross beam, and said arm member being configured and being disposable such that, when said first cross beam is attached to said masts, said second beam is attached to said booms and said lifting pole component is connected to said masts, said arm member is inclined upwardly from said first beam, and the arm member engages said second cross beam such that said lifting pole is able to raise or lower said object.

13. A kit as defined in claim 12 wherein said guide element comprises a sheave for engaging said rope.

14. A kit as defined in claim 12 wherein said releasable attachment means for said lifting pole comprises releasable connecting means for attaching said lifting pole to said first cross beam such that the arm member is able to rest against said second cross beam and said lifting pole is able to raise or lower said object.

15. A kit as defined in claim 12 wherein said object is a chute and said hoist system is for raising and lowering the chute respectively to and from an upwardly extending working chute position, and wherein said lifting pole component comprises a load spreader bar member releasably attachable to said rope by a respective releasable attachment means, said spreader bar member comprising at least two spaced apart rope attachment elements for releasable attachment of the spreader bar member to the chute.

16. A kit as defined in claim 12 wherein said object is a chute and said system is for raising and lowering the chute respectively to and from an upwardly extending working chute position, and wherein said kit comprises boom chute hanging means for association with said booms for releasably engaging the chute such that a raised chute is able to hang thereby from said booms in said working position.

17. A kit as defined in claim 12 wherein said first cross beam has a longitudinal axis, said kit comprising releasable pivot attachment means for pivotally attaching said first cross beam to said masts such that said first cross beam is rotatable about the longitudinal axis thereof, and releasable attachment means for fixing said lifting pole component to said first cross beam such that said arm member is rotatable about the longitudinal axis of said first cross beam towards and away from said second cross beam.

18. A kit as defined in claim 12, wherein said first cross beam has a longitudinal axis, said kit comprising releasable attachment means for fixing said first cross beam to said masts and said kit comprising pivot attachment means for pivotally attaching said lifting pole component to said first cross beam such that said arm member is rotatable about the longitudinal axis of said first cross beam towards and away from said second cross beam.

19. A kit as defined in claim 12 wherein each said counter balance element comprises counterweight means.

20. A kit as defined in 12 comprising respective releasable pivot attachment means for each mast for pivotally attaching the mast to a respective counter balance member such that the mast is able to pivot between a working position and a rearward non-working position and wherein said kit comprises a locking component for each mast for releasably locking said mast in said working position.

21. A kit as defined in claim 14 wherein said guide element comprises a sheave for engaging said rope, wherein each said counter balance element comprises a forward releasable lock point, a rearward releasable pivot point, and counterweight means and wherein said first cross beam has a longitudinal axis, said kit comprising releasable pivot attachment means for pivotally attaching said first cross beam to said masts such that said first cross beam is rotatable about the longitudinal axis thereof, releasable attachment means for fixing said lifting pole component to said first cross beam such that said arm member is rotatable about the longitudinal axis of said first cross beam towards and away from said second cross beam and respective releasable attachment means for each mast for releasably attaching the mast to a respective counterbalance member in a working mast position at the forward releasable lock point on the counter balance member and at the rearward releasable pivot point on the counter balance member such that when the mast is only attached to said counter balance member at said pivot point, the mast is able to pivot about said pivot point between said working mast position and a rearward non-working mast position.

22. A kit as defined in claim 14 wherein said guide element comprises a sheave for engaging said rope, wherein each said counter balance element comprises a forward releasable lock point, a rearward releasable pivot point, and counterweight means, wherein said first cross beam has a longitudinal axis, said kit comprising releasable attachment means for fixing said first cross beam to said masts said kit comprising pivot attachment means for pivotally attaching said lifting pole component to said first cross beam such that said arm member is rotatable about the longitudinal axis of said first cross beam towards and away from said second cross beam and respective releasable attachment means for each mast for releasably attaching the mast to a respective counter balance member in the working mast position at a forward releasable lock point on the counter balance member and at the rearward releasable pivot point on the counter balance member such that when the mast is only attached to said counter balance member at said pivot point, the mast is able to pivot about said pivot point between said working mast position and a rearward non-working mast position.

* * * * *